United States Patent
Kiser et al.

(10) Patent No.: US 12,250,357 B2
(45) Date of Patent: *Mar. 11, 2025

(54) COMBINED HDR/LDR VIDEO STREAMING

(71) Applicant: Contrast, Inc., Albuquerque, NM (US)

(72) Inventors: Willie C. Kiser, Albuquerque, NM (US); Nora Tocci, Albuquerque, NM (US); Michael D. Tocci, Albuquerque, NM (US)

(73) Assignee: CONTRAST, INC., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,569

(22) Filed: Aug. 16, 2023

(65) Prior Publication Data

US 2023/0396726 A1 Dec. 7, 2023

Related U.S. Application Data

(63) Continuation of application No. 17/842,157, filed on Jun. 16, 2022, now Pat. No. 11,785,170, which is a
(Continued)

(51) Int. Cl.
*H04N 1/60* (2006.01)
*G02B 27/10* (2006.01)
(Continued)

(52) U.S. Cl.
CPC ....... *H04N 1/6027* (2013.01); *G02B 27/1013* (2013.01); *G06T 5/70* (2024.01);
(Continued)

(58) Field of Classification Search
CPC .. H04N 1/6027; H04N 1/603; H04N 1/00068; H04N 9/67; H04N 9/09;
(Continued)

(56) References Cited

U.S. PATENT DOCUMENTS 2,560,351 A 7/1951 Kell et al.
2,642,487 A 6/1953 Schroeder
(Continued)

FOREIGN PATENT DOCUMENTS

CN 101344706 B 9/2010
CN 105472265 A 4/2016
(Continued)

OTHER PUBLICATIONS

Aggarwal, 2004, Split Aperture Imaging for High Dynamic Range, Int J Comp Vis 58(1):7-17.
(Continued)

*Primary Examiner* — Timothy R Newlin
(74) *Attorney, Agent, or Firm* — Sullivan & Worcester LLP; Thomas C. Meyers

(57) ABSTRACT

The invention provides methods for broadcasting video in a dual HDR/LDR format such that the video can be displayed in real time by both LDR and HDR display devices. Methods and devices of the invention process streams of pixels from multiple sensors in a frame-independent manner to produce an HDR video signal in real time. That HDR video signal is then tone-mapped to produce an LDR video signal, the LDR signal is subtracted from the HDR signal to calculate a residual signal, and the LDR signal and the residual signal are merged into a combined signal that is broadcast via a communications network.

13 Claims, 11 Drawing Sheets

Related U.S. Application Data continuation of application No. 17/065,789, filed on Oct. 8, 2020, now Pat. No. 11,368,604, which is a continuation of application No. 16/376,149, filed on Apr. 5, 2019, now Pat. No. 10,805,505, which is a continuation of application No. 15/169,012, filed on May 31, 2016, now Pat. No. 10,257,394.

(60) Provisional application No. 62/294,820, filed on Feb. 12, 2016.

(51) Int. Cl.
| | | |
|---|---|---|
| G06T 5/70 | (2024.01) | |
| G06T 7/90 | (2017.01) | |
| G06T 11/60 | (2006.01) | |
| H04N 1/00 | (2006.01) | |
| H04N 5/265 | (2006.01) | |
| H04N 9/64 | (2023.01) | |
| H04N 9/67 | (2023.01) | |
| H04N 17/00 | (2006.01) | |
| H04N 21/2343 | (2011.01) | |
| H04N 21/2365 | (2011.01) | |
| H04N 23/13 | (2023.01) | |
| H04N 23/45 | (2023.01) | |
| H04N 23/741 | (2023.01) | |

(52) U.S. Cl.
CPC ............... *G06T 7/90* (2017.01); *G06T 11/60* (2013.01); *H04N 1/00068* (2013.01); *H04N 1/603* (2013.01); *H04N 5/265* (2013.01); *H04N 9/646* (2013.01); *H04N 9/67* (2013.01); *H04N 17/002* (2013.01); *H04N 21/23439* (2013.01); *H04N 21/2365* (2013.01); *H04N 23/13* (2023.01); *H04N 23/45* (2023.01); *H04N 23/741* (2023.01); *G06T 2207/10024* (2013.01); *G06T 2207/10144* (2013.01); *G06T 2207/20208* (2013.01); *G06T 2207/20221* (2013.01)

(58) Field of Classification Search
CPC .... H04N 9/646; H04N 17/002; H04N 5/2258; H04N 5/2355; H04N 5/265; H04N 21/23439; H04N 21/2365; G06T 7/90; G06T 5/002; G06T 11/60; G06T 2207/10144; G06T 2207/20221; G06T 2207/10024; G06T 2207/20208; G02B 27/1013

See application file for complete search history.

(56) References Cited

U.S. PATENT DOCUMENTS

| | | |
|---|---|---|
| 2,971,051 A | 2/1961 | Back |
| 3,202,039 A | 8/1965 | De et al. |
| 3,381,084 A | 4/1968 | Wheeler |
| 3,474,451 A | 10/1969 | Abel |
| 3,601,480 A | 8/1971 | Randall |
| 3,653,748 A | 4/1972 | Athey |
| 3,659,918 A | 5/1972 | Tan |
| 3,668,304 A | 6/1972 | Eilenberger |
| 3,720,146 A | 3/1973 | Yost |
| 3,802,763 A | 4/1974 | Cook et al. |
| 3,945,034 A | 3/1976 | Suzuki |
| 4,009,941 A | 3/1977 | Verdijk et al. |
| 4,072,405 A | 2/1978 | Ozeki |
| 4,084,180 A | 4/1978 | Stoffels et al. |
| 4,134,683 A | 1/1979 | Goetz et al. |
| 4,268,119 A | 5/1981 | Hartmann |
| 4,395,234 A | 7/1983 | Shenker |
| 4,396,188 A | 8/1983 | Dreissigacker et al. |
| 4,486,069 A | 12/1984 | Neil et al. |
| 4,555,163 A | 11/1985 | Wagner |
| 4,584,606 A | 4/1986 | Nagasaki |
| 4,743,011 A | 5/1988 | Coffey |
| 4,786,813 A | 11/1988 | Svanberg et al. |
| 4,805,037 A | 2/1989 | Noble et al. |
| 4,916,529 A | 4/1990 | Yamamoto et al. |
| 4,933,751 A | 6/1990 | Shinonaga et al. |
| 5,024,530 A | 6/1991 | Mende |
| 5,092,581 A | 3/1992 | Koz |
| 5,093,563 A | 3/1992 | Small et al. |
| 5,134,468 A | 7/1992 | Ohmuro |
| 5,153,621 A | 10/1992 | Vogeley |
| 5,155,623 A | 10/1992 | Miller et al. |
| 5,194,959 A | 3/1993 | Kaneko et al. |
| 5,272,518 A | 12/1993 | Vincent |
| 5,275,518 A | 1/1994 | Guenther |
| 5,355,165 A | 10/1994 | Kosonocky et al. |
| 5,386,316 A | 1/1995 | Cook |
| 5,642,191 A | 6/1997 | Mende |
| 5,644,432 A | 7/1997 | Doany |
| 5,707,322 A | 1/1998 | Dreissigacker et al. |
| 5,729,011 A | 3/1998 | Sekiguchi |
| 5,734,507 A | 3/1998 | Harvey |
| 5,801,773 A | 9/1998 | Ikeda |
| 5,835,278 A | 11/1998 | Rubin et al. |
| 5,856,466 A | 1/1999 | Cook et al. |
| 5,881,043 A | 3/1999 | Hasegawa et al. |
| 5,881,180 A | 3/1999 | Chang et al. |
| 5,900,942 A | 5/1999 | Spiering |
| 5,905,490 A | 5/1999 | Shu et al. |
| 5,926,283 A | 7/1999 | Hopkins |
| 5,929,908 A | 7/1999 | Takahashi et al. |
| 6,011,876 A | 1/2000 | Kishner |
| 6,215,597 B1 | 4/2001 | Duncan et al. |
| 6,243,143 B1 * | 6/2001 | Hatalsky ............... H04N 5/265 348/584 |
| 6,392,687 B1 | 5/2002 | Driscoll et al. |
| 6,429,016 B1 | 8/2002 | McNeil |
| 6,614,478 B1 | 9/2003 | Mead |
| 6,633,683 B1 | 10/2003 | Dinh et al. |
| 6,646,716 B1 | 11/2003 | Ramanujan et al. |
| 6,674,487 B1 * | 1/2004 | Smith .................... H04N 9/643 348/E9.04 |
| 6,747,694 B1 | 6/2004 | Nishikawa et al. |
| 6,801,719 B1 | 10/2004 | Szajewski et al. |
| 6,856,466 B2 | 2/2005 | Tocci |
| 6,937,770 B1 | 8/2005 | Oguz et al. |
| 7,068,890 B2 | 6/2006 | Soskind et al. |
| 7,084,905 B1 | 8/2006 | Nayar et al. |
| 7,138,619 B1 | 11/2006 | Ferrante et al. |
| 7,177,085 B2 | 2/2007 | Tocci et al. |
| 7,283,307 B2 | 10/2007 | Couture et al. |
| 7,336,299 B2 | 2/2008 | Kostrzewski et al. |
| 7,397,509 B2 | 7/2008 | Krymski |
| 7,405,882 B2 | 7/2008 | Uchiyama et al. |
| 7,535,647 B1 | 5/2009 | Otten et al. |
| 7,623,781 B1 | 11/2009 | Sassa |
| 7,714,998 B2 | 5/2010 | Furman et al. |
| 7,719,674 B2 | 5/2010 | Furman et al. |
| 7,731,637 B2 | 6/2010 | D'Eredita |
| 7,961,398 B2 | 6/2011 | Tocci |
| 8,035,711 B2 * | 10/2011 | Liu ..................... H04N 25/134 348/277 |
| 8,320,047 B2 | 11/2012 | Tocci |
| 8,323,047 B2 | 12/2012 | Reusche et al. |
| 8,340,442 B1 * | 12/2012 | Rasche ............... H04N 19/126 382/254 |
| 8,441,732 B2 | 5/2013 | Tocci |
| 8,606,009 B2 | 12/2013 | Sun |
| 8,610,789 B1 | 12/2013 | Nayar et al. |
| 8,619,368 B2 | 12/2013 | Tocci |
| 8,622,876 B2 | 1/2014 | Kelliher |
| 8,659,683 B1 | 2/2014 | Linzer |
| 8,843,938 B2 | 9/2014 | Macfarlane et al. |
| 8,982,962 B2 | 3/2015 | Alshin et al. |
| 9,087,229 B2 | 7/2015 | Nguyen et al. |
| 9,129,445 B2 | 9/2015 | Mai et al. |
| 9,131,150 B1 | 9/2015 | Mangiat et al. |

(56) References Cited

U.S. PATENT DOCUMENTS

| | | | |
|---|---|---|---|
| 9,258,468 B2 | 2/2016 | Cotton et al. | |
| 9,264,659 B2 | 2/2016 | Abuan et al. | |
| 9,277,122 B1 | 3/2016 | Imura et al. | |
| 9,459,692 B1 | 10/2016 | Li | |
| 9,488,984 B1 | 11/2016 | Williams et al. | |
| 9,560,339 B2 | 1/2017 | Borowski | |
| 9,633,417 B2 | 4/2017 | Sugimoto et al. | |
| 9,654,738 B1 | 5/2017 | Ferguson et al. | |
| 9,661,245 B2 | 5/2017 | Kawano | |
| 9,675,236 B2 | 6/2017 | McDowall | |
| 9,677,840 B2 | 6/2017 | Rublowsky et al. | |
| 9,720,231 B2 | 8/2017 | Erinjippurath et al. | |
| 9,779,490 B2 | 10/2017 | Bishop | |
| 9,800,856 B2 | 10/2017 | Venkataraman et al. | |
| 9,904,981 B2 | 2/2018 | Jung et al. | |
| 9,948,829 B2 | 4/2018 | Kiser et al. | |
| 9,955,084 B1 | 4/2018 | Haynold | |
| 9,974,996 B2 | 5/2018 | Kiser | |
| 9,998,692 B1 | 6/2018 | Griffiths | |
| 10,038,855 B2 | 7/2018 | Cote et al. | |
| 10,165,182 B1 | 12/2018 | Chen | |
| 10,200,569 B2 | 2/2019 | Kiser et al. | |
| 10,257,393 B2 | 4/2019 | Kiser et al. | |
| 10,257,394 B2 | 4/2019 | Kiser et al. | |
| 10,264,196 B2 | 4/2019 | Kiser et al. | |
| 10,536,612 B2 | 1/2020 | Kiser et al. | |
| 10,554,901 B2 | 2/2020 | Kiser et al. | |
| 10,616,512 B2 | 4/2020 | Ingle et al. | |
| 10,679,320 B1 | 6/2020 | Kunz | |
| 10,742,847 B2 | 8/2020 | Kiser et al. | |
| 10,805,505 B2 | 10/2020 | Kiser et al. | |
| 10,819,925 B2 | 10/2020 | Kiser et al. | |
| 10,951,888 B2 | 3/2021 | Kiser et al. | |
| 11,368,604 B2* | 6/2022 | Kiser | H04N 23/45 |
| 2002/0014577 A1 | 2/2002 | Ulrich et al. | |
| 2002/0089765 A1 | 7/2002 | Nalwa | |
| 2003/0007254 A1 | 1/2003 | Tocci | |
| 2003/0016334 A1 | 1/2003 | Weber et al. | |
| 2003/0048493 A1 | 3/2003 | Pontifex et al. | |
| 2003/0072011 A1 | 4/2003 | Shirley | |
| 2003/0081674 A1 | 5/2003 | Malvar | |
| 2003/0122930 A1 | 7/2003 | Schofield et al. | |
| 2003/0138154 A1 | 7/2003 | Suino | |
| 2004/0119020 A1 | 6/2004 | Bodkin | |
| 2004/0125228 A1 | 7/2004 | Dougherty | |
| 2004/0143380 A1 | 7/2004 | Stam et al. | |
| 2004/0156134 A1 | 8/2004 | Furuki et al. | |
| 2004/0179834 A1 | 9/2004 | Szajewski et al. | |
| 2004/0202376 A1 | 10/2004 | Schwartz et al. | |
| 2005/0001983 A1 | 1/2005 | Weber et al. | |
| 2005/0041113 A1 | 2/2005 | Nayar et al. | |
| 2005/0099504 A1 | 5/2005 | Nayar et al. | |
| 2005/0117799 A1 | 6/2005 | Fuh et al. | |
| 2005/0151860 A1 | 7/2005 | Silverstein et al. | |
| 2005/0157943 A1* | 7/2005 | Ruggiero | G06T 3/4007 |
| | | | 348/E5.075 |
| 2005/0168578 A1 | 8/2005 | Gobush | |
| 2005/0198482 A1 | 9/2005 | Cheung et al. | |
| 2005/0212827 A1 | 9/2005 | Goertzen | |
| 2005/0219659 A1 | 10/2005 | Quan | |
| 2006/0001761 A1 | 1/2006 | Haba et al. | |
| 2006/0002611 A1* | 1/2006 | Mantiuk | H04N 19/154 |
| | | | 375/E7.129 |
| 2006/0061680 A1 | 3/2006 | Madhavan et al. | |
| 2006/0104508 A1* | 5/2006 | Daly | G06T 5/92 |
| | | | 382/167 |
| 2006/0184040 A1 | 8/2006 | Keller et al. | |
| 2006/0209204 A1 | 9/2006 | Ward | |
| 2006/0215882 A1 | 9/2006 | Ando et al. | |
| 2006/0221209 A1* | 10/2006 | McGuire | H01L 27/14625 |
| | | | 382/294 |
| 2006/0249652 A1* | 11/2006 | Schleifer | H04N 1/047 |
| | | | 250/208.1 |
| 2006/0262275 A1 | 11/2006 | Domroese et al. | |
| 2007/0025717 A1 | 2/2007 | Raskar et al. | |
| 2007/0030276 A1* | 2/2007 | MacInnis | H04N 9/75 |
| | | | 345/505 |
| 2007/0073484 A1 | 3/2007 | Horibe | |
| 2007/0086087 A1 | 4/2007 | Dent et al. | |
| 2007/0133889 A1 | 6/2007 | Horie et al. | |
| 2007/0152804 A1 | 7/2007 | Breed et al. | |
| 2007/0182844 A1 | 8/2007 | Allman et al. | |
| 2007/0189750 A1 | 8/2007 | Wong et al. | |
| 2007/0189758 A1 | 8/2007 | Iwasaki | |
| 2007/0201560 A1* | 8/2007 | Segall | H04N 19/61 |
| | | | 375/E7.184 |
| 2007/0258641 A1* | 11/2007 | Srinivasan | H04N 1/407 |
| | | | 382/166 |
| 2008/0013051 A1 | 1/2008 | Glinski et al. | |
| 2008/0030611 A1 | 2/2008 | Jenkins | |
| 2008/0037883 A1 | 2/2008 | Tsutsumi et al. | |
| 2008/0055683 A1 | 3/2008 | Choe et al. | |
| 2008/0068721 A1 | 3/2008 | Murnan et al. | |
| 2008/0094486 A1 | 4/2008 | Fuh et al. | |
| 2008/0100910 A1 | 5/2008 | Kim et al. | |
| 2008/0112651 A1 | 5/2008 | Cho et al. | |
| 2008/0175496 A1* | 7/2008 | Segall | H04N 19/105 |
| | | | 382/238 |
| 2008/0198235 A1 | 8/2008 | Chen et al. | |
| 2008/0198266 A1* | 8/2008 | Kurane | H04N 9/67 |
| | | | 348/557 |
| 2008/0239155 A1 | 10/2008 | Wong et al. | |
| 2008/0297460 A1* | 12/2008 | Peng | G09G 3/3426 |
| | | | 345/102 |
| 2008/0304562 A1 | 12/2008 | Chang et al. | |
| 2009/0015683 A1 | 1/2009 | Ando | |
| 2009/0059048 A1* | 3/2009 | Luo | H04N 25/46 |
| | | | 348/308 |
| 2009/0161019 A1 | 6/2009 | Jang | |
| 2009/0213225 A1* | 8/2009 | Jin | H04N 23/63 |
| | | | 348/836 |
| 2009/0225433 A1 | 9/2009 | Tocci | |
| 2009/0244717 A1 | 10/2009 | Tocci | |
| 2009/0290043 A1* | 11/2009 | Liu | H04N 23/12 |
| | | | 348/E9.051 |
| 2010/0098333 A1 | 4/2010 | Aoyagi | |
| 2010/0100268 A1 | 4/2010 | Zhang et al. | |
| 2010/0149546 A1 | 6/2010 | Kobayashi et al. | |
| 2010/0172409 A1 | 7/2010 | Reznik et al. | |
| 2010/0201799 A1 | 8/2010 | Mohrholz et al. | |
| 2010/0225783 A1 | 9/2010 | Wagner | |
| 2010/0266008 A1 | 10/2010 | Reznik | |
| 2010/0271512 A1* | 10/2010 | Garten | H04N 5/232 |
| | | | 382/284 |
| 2010/0328780 A1 | 12/2010 | Tocci | |
| 2011/0028278 A1 | 2/2011 | Roach | |
| 2011/0058050 A1* | 3/2011 | Lasang | H04N 5/144 |
| | | | 348/208.4 |
| 2011/0188744 A1* | 8/2011 | Sun | G06T 5/94 |
| | | | 382/162 |
| 2011/0194618 A1* | 8/2011 | Gish | G06T 5/50 |
| | | | 375/E7.027 |
| 2011/0221793 A1 | 9/2011 | King et al. | |
| 2012/0025080 A1 | 2/2012 | Liu et al. | |
| 2012/0134551 A1* | 5/2012 | Wallace | H04N 21/25825 |
| | | | 382/128 |
| 2012/0147953 A1 | 6/2012 | El-Mahdy et al. | |
| 2012/0154370 A1 | 6/2012 | Russell et al. | |
| 2012/0179833 A1* | 7/2012 | Kenrick | H04N 21/4333 |
| | | | 709/231 |
| 2012/0193520 A1 | 8/2012 | Bewersdorf et al. | |
| 2012/0212964 A1 | 8/2012 | Chang et al. | |
| 2012/0241867 A1 | 9/2012 | Ono et al. | |
| 2012/0242867 A1* | 9/2012 | Shuster | H04N 23/74 |
| | | | 348/240.2 |
| 2012/0260174 A1 | 10/2012 | Imaida et al. | |
| 2012/0299940 A1* | 11/2012 | Dietrich, Jr. | H04N 19/61 |
| | | | 345/522 |
| 2012/0307893 A1 | 12/2012 | Reznik et al. | |
| 2013/0021447 A1 | 1/2013 | Brisedoux et al. | |
| 2013/0021505 A1* | 1/2013 | Plowman | G06T 1/0007 |
| | | | 348/241 |

(56) References Cited

U.S. PATENT DOCUMENTS

| | | |
|---|---|---|
| 2013/0027565 A1 | 1/2013 | Solhusvik et al. |
| 2013/0038689 A1 | 2/2013 | Mcdowall |
| 2013/0057971 A1 | 3/2013 | Zhao et al. |
| 2013/0063300 A1 | 3/2013 | Oregan et al. |
| 2013/0064448 A1 | 3/2013 | Tomaselli et al. |
| 2013/0093805 A1 | 4/2013 | Iversen |
| 2013/0094705 A1* | 4/2013 | Tyagi .................. F16P 3/142 382/103 |
| 2013/0107956 A1* | 5/2013 | Muijs .................. H04N 19/14 375/240.12 |
| 2013/0108183 A1* | 5/2013 | Bruls .................. H04N 19/187 382/233 |
| 2013/0148139 A1 | 6/2013 | Matsuhira |
| 2013/0190965 A1 | 7/2013 | Einecke et al. |
| 2013/0194675 A1 | 8/2013 | Tocci |
| 2013/0215290 A1 | 8/2013 | Solhusvik et al. |
| 2013/0250113 A1 | 9/2013 | Bechtel et al. |
| 2013/0258044 A1 | 10/2013 | Betts-Lacroix |
| 2013/0286451 A1 | 10/2013 | Verhaegh |
| 2013/0329053 A1 | 12/2013 | Jones et al. |
| 2013/0329087 A1 | 12/2013 | Tico et al. |
| 2014/0002694 A1 | 1/2014 | Levy et al. |
| 2014/0063300 A1* | 3/2014 | Lin .................. H04N 23/843 348/277 |
| 2014/0085422 A1 | 3/2014 | Aronsson et al. |
| 2014/0104051 A1 | 4/2014 | Breed |
| 2014/0132946 A1 | 5/2014 | Sebastian et al. |
| 2014/0152694 A1* | 6/2014 | Narasimha .............. G06T 5/50 345/629 |
| 2014/0168486 A1* | 6/2014 | Geiss .................. H04N 23/73 348/294 |
| 2014/0184894 A1 | 7/2014 | Motta |
| 2014/0192214 A1 | 7/2014 | Laroia |
| 2014/0198187 A1 | 7/2014 | Lukk |
| 2014/0204195 A1 | 7/2014 | Katashiba et al. |
| 2014/0210847 A1* | 7/2014 | Knibbeler .............. H04N 7/00 345/589 |
| 2014/0263950 A1* | 9/2014 | Fenigstein .............. H04N 25/59 250/208.1 |
| 2014/0297671 A1 | 10/2014 | Richard |
| 2014/0300795 A1 | 10/2014 | Bilcu et al. |
| 2014/0313369 A1 | 10/2014 | Kageyama et al. |
| 2014/0321766 A1 | 10/2014 | Jo |
| 2015/0077281 A1 | 3/2015 | Taniguchi et al. |
| 2015/0078661 A1 | 3/2015 | Granados et al. |
| 2015/0138339 A1 | 5/2015 | Einecke et al. |
| 2015/0151725 A1 | 6/2015 | Clarke et al. |
| 2015/0172608 A1 | 6/2015 | Routhier et al. |
| 2015/0175161 A1 | 6/2015 | Breed |
| 2015/0201222 A1* | 7/2015 | Mertens .................. H04N 19/98 382/233 |
| 2015/0208024 A1* | 7/2015 | Takahashi .......... H04N 21/2343 386/353 |
| 2015/0215595 A1 | 7/2015 | Yoshida |
| 2015/0245043 A1 | 8/2015 | Greenebaum et al. |
| 2015/0245044 A1 | 8/2015 | Guo et al. |
| 2015/0249105 A1 | 9/2015 | Skeete |
| 2015/0296140 A1 | 10/2015 | Kim |
| 2015/0296154 A1* | 10/2015 | Laroia .................. H04N 25/531 348/340 |
| 2015/0302562 A1* | 10/2015 | Zhai .................. H04N 19/44 382/233 |
| 2015/0312498 A1 | 10/2015 | Kawano |
| 2015/0312536 A1 | 10/2015 | Butler et al. |
| 2016/0007052 A1 | 1/2016 | Haitsuka et al. |
| 2016/0007910 A1 | 1/2016 | Boss et al. |
| 2016/0026253 A1 | 1/2016 | Bradski et al. |
| 2016/0050354 A1* | 2/2016 | Musatenko .............. G06T 5/50 348/229.1 |
| 2016/0057333 A1 | 2/2016 | Liu et al. |
| 2016/0093029 A1 | 3/2016 | Micovic et al. |
| 2016/0163356 A1* | 6/2016 | De Haan .......... H04N 21/42646 386/241 |
| 2016/0164120 A1 | 6/2016 | Swiegers et al. |
| 2016/0165120 A1 | 6/2016 | Lim |
| 2016/0173811 A1* | 6/2016 | Oh .................. H04N 7/015 725/116 |
| 2016/0191795 A1 | 6/2016 | Han et al. |
| 2016/0195877 A1 | 7/2016 | Franzius et al. |
| 2016/0205341 A1 | 7/2016 | Hollander et al. |
| 2016/0205368 A1* | 7/2016 | Wallace .................. H04N 9/64 348/571 |
| 2016/0227193 A1 | 8/2016 | Osterwood et al. |
| 2016/0252727 A1 | 9/2016 | Mack et al. |
| 2016/0307602 A1 | 10/2016 | Mertens |
| 2016/0323518 A1 | 11/2016 | Rivard et al. |
| 2016/0344977 A1 | 11/2016 | Murao |
| 2016/0345032 A1* | 11/2016 | Tsukagoshi ........ H04N 21/2343 |
| 2016/0353123 A1* | 12/2016 | Ninan .................. H04N 19/36 |
| 2016/0360212 A1* | 12/2016 | Dai .................. H04N 19/186 |
| 2016/0360213 A1 | 12/2016 | Lee et al. |
| 2016/0375297 A1 | 12/2016 | Kiser |
| 2017/0006273 A1* | 1/2017 | Borer .................. G06T 5/92 |
| 2017/0026594 A1 | 1/2017 | Shida et al. |
| 2017/0039716 A1 | 2/2017 | Morris et al. |
| 2017/0070719 A1* | 3/2017 | Smolic .................. H04N 25/57 |
| 2017/0084006 A1 | 3/2017 | Stewart |
| 2017/0126987 A1* | 5/2017 | Tan .................. H04N 23/741 |
| 2017/0155818 A1 | 6/2017 | Bonnet |
| 2017/0155873 A1 | 6/2017 | Nguyen |
| 2017/0186141 A1 | 6/2017 | Ha et al. |
| 2017/0237879 A1 | 8/2017 | Kiser et al. |
| 2017/0237890 A1 | 8/2017 | Kiser et al. |
| 2017/0237913 A1 | 8/2017 | Kiser et al. |
| 2017/0238029 A1 | 8/2017 | Kiser et al. |
| 2017/0270702 A1 | 9/2017 | Gauthier et al. |
| 2017/0279530 A1 | 9/2017 | Tsukagoshi |
| 2017/0302858 A1 | 10/2017 | Porter et al. |
| 2017/0352131 A1 | 12/2017 | Berlin et al. |
| 2018/0005356 A1 | 1/2018 | Van Der Vleuten et al. |
| 2018/0048801 A1 | 2/2018 | Kiser et al. |
| 2018/0054566 A1 | 2/2018 | Yaguchi |
| 2018/0063537 A1 | 3/2018 | Sasai et al. |
| 2018/0152721 A1 | 5/2018 | Rusanovskyy et al. |
| 2018/0198957 A1 | 7/2018 | Kiser et al. |
| 2019/0014308 A1 | 1/2019 | Kiser et al. |
| 2019/0130630 A1 | 5/2019 | Ackerson et al. |
| 2019/0166283 A1 | 5/2019 | Kiser et al. |
| 2019/0238725 A1 | 8/2019 | Kiser et al. |
| 2019/0238726 A1 | 8/2019 | Kiser et al. |
| 2019/0238766 A1 | 8/2019 | Kiser et al. |
| 2019/0373260 A1 | 12/2019 | Kiser et al. |
| 2020/0036918 A1 | 1/2020 | Ingle et al. |
| 2020/0058104 A1 | 2/2020 | Kiser et al. |
| 2020/0059670 A1 | 2/2020 | Kiser et al. |
| 2020/0154030 A1 | 5/2020 | Kiser et al. |
| 2020/0320955 A1 | 10/2020 | Kiser et al. |
| 2020/0368616 A1 | 11/2020 | Delamont |
| 2021/0029271 A1 | 1/2021 | Kiser et al. |
| 2021/0034342 A1 | 2/2021 | Hoy |
| 2021/0044765 A1 | 2/2021 | Kiser et al. |
| 2021/0099616 A1 | 4/2021 | Kiser et al. |
| 2021/0227220 A1 | 7/2021 | Kiser et al. |

FOREIGN PATENT DOCUMENTS

| | | |
|---|---|---|
| EP | 0484802 A2 | 5/1992 |
| EP | 1225574 A2 | 7/2002 |
| EP | 1395062 A1 | 3/2004 |
| GB | 2526047 A | 11/2015 |
| GB | 2539917 A | 1/2017 |
| JP | S53093026 | 8/1978 |
| JP | S53124028 A | 10/1978 |
| JP | S63160489 A | 7/1988 |
| JP | H0468876 B2 | 3/1992 |
| JP | H0564070 B2 | 3/1993 |
| JP | H06335006 A | 12/1994 |
| JP | H07107346 B2 | 4/1995 |
| JP | H08220585 A | 8/1996 |
| JP | H11127441 A | 5/1999 |
| JP | 2000019407 A | 1/2000 |
| JP | 2000338313 A | 12/2000 |
| JP | 2001136434 A | 5/2001 |

(56) References Cited

FOREIGN PATENT DOCUMENTS

| | | |
|---|---|---|
| JP | 2002165108 A | 6/2002 |
| JP | 2002369210 A | 12/2002 |
| JP | 2003035881 A | 2/2003 |
| JP | 2005117524 A | 4/2005 |
| JP | 2007-96510 | 4/2007 |
| JP | 2007-243942 | 9/2007 |
| JP | 2007-281816 | 10/2007 |
| JP | 2007295326 A | 11/2007 |
| JP | 2009-17157 | 1/2009 |
| JP | 2013027021 A | 2/2013 |
| JP | 2014524290 A | 9/2014 |
| KR | 101310140 B1 | 9/2013 |
| WO | 2005025685 A1 | 3/2005 |
| WO | 2009043494 A1 | 4/2009 |
| WO | 2009111642 A1 | 9/2009 |
| WO | 2009121068 A2 | 10/2009 |
| WO | 2011032028 A2 | 3/2011 |
| WO | 2012076646 A1 | 6/2012 |
| WO | 2013025530 A1 | 2/2013 |
| WO | 2015072754 A1 | 5/2015 |
| WO | 2015173570 A1 | 11/2015 |
| WO | 2017139363 A1 | 8/2017 |
| WO | 2017139596 A1 | 8/2017 |
| WO | 2017139600 A1 | 8/2017 |
| WO | 2017157845 A1 | 9/2017 |

OTHER PUBLICATIONS

Alleysson, 2006, HDR CFA Image Rendering, Proc EURASIP 14th European Signal Processing Conf. (5 pages).

Altera, 2010, Memory System Design, Chapter 7 in Embedded Design Handbook, Altera Corporation (18 pages).

Banterle, 2009, High dynamic range imaging and low dynamic range expansion for generating HDR content, Eurographics State of the The Art Report (18 pages).

Borer, 2014, Non-linear opto-electrical transfer functions for high dynamic range television, Research and Development White Paper, British Broadcasting Corporation (24 pages).

Bravo, 2011, Efficient smart CMOS camera based on FPGAs oriented to embedded image processing, Sensors 11:2282-2303.

Chan, 2005, Visual programming support for graph-oriented parallel/ distributed processing, Softw Pract Exper 35:1409-1439.

Damazio, 2006, A codec architecture for real-time High Dynamic Range video, VIII Symposium on Virtual and Augmented Reality (Belém, PA, Brazil) (9 pages).

Dao, 2003, Dynamic configuration management in a graph-oriented distributed programming environment, Sci Comp Prog 48:43-65.

Dao, 2005, GOP: A graph-oriented programming model for parallel and distributed systems, Chapter 2 in New Horizons of Parallel and Distributed Computing, Guo & Yang, Eds., Springer (Boston, MA) (17 pages).

Debevec, 1997, Recovering High Dynamic Range Radiance Maps from Photographs, Int Conf Comp Graphics and Interactive Techniques, proceedings (10 pages).

Dhanani, 2008, HD video line buffering in FPGA, EE Times (5 pages).

Flux Data Inc, 2008, FD-1665 High Resolution 3 CCD Multispectral Industrial Camera, web.archive. orgweb20080113023949www.fluxdata.com/prod (7 pages).

Geronimo, 2010, Survey of pedestrian detection for advanced driver assistance systems, IEEE Trans Pat Anal Mach Int 32(7):1239-58.

Gurel, 2016, A comparative study between RTL and HLS for image processing applications with FPGAs, Thesis, UC San Diego (78 pages).

Hegarty, 2014, Darkroom: compiling high-level image processing code into hardware pipelines, ACM Trans Graph 33(4):144.

Jack, 2005, Color spaces, Chapter 3 in Video Demystified: A Handbook for the Digital Engineer, 4Ed, Newnes (20 pages).

Kao, 2008, High Dynamic Range Imaging by Fusing Multiple Raw Images and Tone Reproduction, IEEE Transactions on Consumer Electronics 54(1):10-15.

Kresch, 1999, Fast DCT domain filtering using the DCT and the DST, IEEE Trans Imag Proc (29 pages).

Lawal, 2007, C++ based system synthesis of real-time video processing systems targeting FPGA implementation, IEEE Int Par Dist Proc Symposium, Rome, pp. 1-7.

Lawal, 2008, Memory synthesis for FPGA implementations of real-time video processing systems, Thesis, Mid Sweder U (102 pages).

Lukac, 2004, Demosaicked Image Postprocessing Using Local Color Ratios, IEEE Transactions on Circuits and Systems for Video Technology 14(6):914-920.

Lyu, 2014, A 12-bit high-speed col. parallel two-step single-slope analog-to-digital converter (ADC) for CMOS mage sensors, Sensors 14:21603-21625.

Myszkowki, 2008, High Dynamic Range Video, Morgan & Claypool Publishers, San Rafael, CA (158 pages).

Nayar, 2000, High dynamic range imaging: spatially varying pixel exposures, 2000 Proc IEEE Conf on Comp Vision and Pattern Rec, ISSN: 1063-6919 (8 pages).

Nosratinia, 2002, Enhancement of JPEG-compressed images by re-application of JPEG, Journal of VLSI signal processing systems for signal, image and video technology (20 pages).

Oliveira, 2012, Functional programming with structured graphs, ICFP'12 (12 pages).

Rahman, 2011, Pipeline synthesis and optimization of FPGA-based video processing applications with CAL, EURASIP J Image Vid Processing 19:1-28.

Roberts, 2017, Lossy Data Compression: JPEG, Stanford faculty page (5 pages) Retrieved from the Internet on Feb. 3, 2017, from <https://cs.stanford.edu/people/eroberts/courses/soco/projects/data-compression/lossy/jpeg/ict.htm>( 5 pages).

Schulte, 2016, HDR Demystified: Emerging UHDTV systems, SpectraCal 1-22.

Sedigh, 1998, Evaluation of filtering mechanisms for MPEG video communications, IEES Symp Rel Dist Sys (6 pages).

Sony, 2017, HDR (High Dynamic Range), Sony Corporation (15 pages).

Stumpfel, 2004, Direct HDR Capture of the Sun and Sky, Computer graphics, virtual reality, visualisation and Interaction in Africa (9 pages).

Tiwari, 2015, A review on high-dynamic range imaging with its technique, Int J Sig Proc, IPPR 8(9):93-100.

Tocci, 2011, A versatile HDR video production system, ACM Transactions on Graphics (TOG)-Proceedings of ACM SIGGRAPH 2011, 30(4):article 41 (9 pages).

Touze, 2014, HDR video coding based on local LDR quantization, Second International Conference and SME Workshop on HDR imaging (6 pages).

Unattributed, 2018, JPEG YCbCr Support, Microsoft, Retrieved from the Internet on Nov. 20, 2019 from <https://docs.microsoft.corn/en-us/windows/win32/wic/jpeg-ycbcr-support> (14 pages).

Wong, 2017, Ultra-low latency contiguous block-parallel stream windowing using FPGA on-chip memory, FPT 56-63.

"Australian Examination Report issued in Australian Application No. 2017217929, dated Sep. 30, 2020".

"Int Search Report and Written Opinion dated Apr. 14, 2017, for PCT/US2017/17396".

"Int Search Report and Written Opinion dated Apr. 28, 2017, for PCT/US2017/17405".

"Int Search Report and Written Opinion dated Dec. 10, 2019, for PCT/US19/046350".

"Int Search Report and Written Opinion dated Dec. 6, 2019, for PCT/US19/46348".

"Int Search Report and Written Opinion dated May 2, 2017, for PCT/US17/16991".

"Int Search Report and Written Opinion dated May 8, 2017, for PCT/US17/17400".

"Int Search Report and Written Opinion dated Oct. 23, 2017, for PCT/US17/45683".

"Int Search Report and Written Opinion dated Oct. 23, 2020, for PCT/US2020/044724".

"Int Search Report and Written Opinion dated Sep. 11, 2019, for PCT/US19/35109".

(56) References Cited

OTHER PUBLICATIONS

"Int Search Report and Written Opinion dated Sep. 20, 2018, for PCT/US2018/041034".

* cited by examiner

COMBINED HDR/LDR VIDEO STREAMING

TECHNICAL FIELD

This disclosure relates to real-time production and broadcast of video for display on Low Dynamic Range and High Dynamic Range display devices.

BACKGROUND

The human visual system is capable of identifying and processing visual features with High Dynamic Range. For example, real-world scenes with contrast ratios of 1,000,000:1 or greater can be accurately processed by the human visual cortex. However, most image acquisition devices are only capable of reproducing or capturing Low Dynamic Range, resulting in a loss of image accuracy. The problem is ever more significant in video imaging.

There are examples of creating High Dynamic Range images by post processing images from multiple sensors, each of different exposures. The resulting "blended" image is intended to capture a broader dynamic range than would be possible from a single sensor without a post-processing operation. However, the required post-processing is time-intensive and produces an HDR video signal that requires an expensive HDR playback device and display device.

The requirement for intensive post-processing and uncommon equipment leads to HDR video systems that are not well suited to how many people watch television. For example, live broadcasts are an important part of television. Many people follow the news or their favorite sports teams by watching events live, whereas existing HDR video production requires filming followed by post-production processing and then display. Additionally, some HDR video systems are not backwards-compatible with the existing installed base of users who have low dynamic range (LDR) televisions.

SUMMARY

The invention provides methods for broadcasting video in a dual HDR/LDR format such that the video can be displayed in real time by both LDR and HDR display devices. Methods and devices of the invention process streams of pixels from multiple sensors in a frame-independent manner to produce High Dynamic Range (HDR) video signals in real time. The real-time aspect of the invention is accomplished by analyzing streams of pixels from the various sensors without reference to the frame to which those pixels belong. Thus, the frame-independent nature of the invention means that there is no need to wait for an entire frame of data to be read from a sensor before processing pixel data. The result is an HDR video that has a dynamic range greater than the range that can be obtained using a single image sensor, typically 8 bits in depth. That HDR video signal is then tone-mapped to produce an LDR video signal, the LDR signal is subtracted from the HDR signal to calculate a residual signal, and the LDR signal and the residual signal are merged into a combined signal that is broadcast via a communications network. The combined signal is backwards compatible with existing LDR display devices because those devices simply use the LDR signal of the combined signal. The combined signal is also displayable by HDR displays by merging the residuals back with the LDR signal to re-create the HDR video signal. The HDR video starts with the multiple sensors that are exposed to identical scenes with different light levels and that each produce an ordered stream of pixel values. The pixel values are processed in real-time and independent of frame in which they will reside. The video processing pipeline used to produce HDR images includes kernel and merge operations that identify saturated pixel values and merge streams of pixel values. The merging operation includes replacing saturated pixel values with corresponding pixel values originating from a different sensor. The merged signal is an HDR signal and is tone mapped to produce the LDR signal and the residuals. The residuals are combined with the LDR signal into a combined signal that is broadcast for LDR and HDR display by LDR and HDR devices, respectively.

The dual LDR/HDR video broadcast is provided in real time by streaming the pixel values through the kernel and merge operations in the pipeline. Preferably, a synchronization module in the pipeline synchronizes the streams of pixel values arriving from the sensors. This means that when, for example, the $60^{th}$ pixel from a first sensor enters the kernel operation, the $60^{th}$ pixel from each of the other sensors is also simultaneously entering the kernel operation. As a result, pixel values from corresponding pixels on different sensors flow through the pipeline synchronously. This allows two things. First, the synchronization module can correct small phase discrepancies in data arrival times to the system from multiple sensors. Second, the synchronization allows the kernel operation to consider—for a given pixel value from a specific pixel on one of the image sensors—values from the neighborhood of surrounding pixels on that sensor and also consider values from a corresponding neighborhood of pixels on another of the image sensors. This allows the kernel operation to create an estimated value for a saturated pixel from one sensor based on a pattern of values from the surrounding neighborhood on the same or another sensor.

The pipeline may optionally correct for differences in spectral characteristics of each of the multiple sensors. Optical components such as beamsplitters, lenses, or filters—even if purported to be spectrally neutral—may have slight wavelength-dependent differences in the amounts of light transmitted. That is, each image sensor may be said to have its own "color correction space" whereby images from that sensor need to be corrected out of that color correction space to true color. The optical system can be calibrated (e.g., by taking a picture of a calibration card) and a color correction matrix can be determined and stored for each image sensor. The HDR video pipeline can then perform the counter-intuitive step of adjusting the pixel values from one sensor toward the color correction space of another sensor—which may in some cases involve nudging the colors away from true color. This may be accomplished by multiplying a vector of RGB values from the one sensor by the inverse of the color correction matrix of the other sensor. After this color correction to the second sensor, the streams are merged, and the resulting HDR video signal is color corrected to true color (e.g., by multiplying the RGB vectors by the applicable color correction matrix). This operation accounts for spectral differences of each image sensor.

A preferred pipeline includes other processing modules as described in detail in the Detailed Description of the invention below.

In certain aspects, the invention provides methods for streaming video for high dynamic range (HDR) and low dynamic range (LDR) display. The methods include receiving pixel values from multiple image sensors on an HDR video camera and producing an HDR signal, processing the HDR signal to produces an output signal comprising an LDR signal and a residual signal, and transmitting the output signal for HDR and LDR display with less than one frame of delay between the receiving and the transmitting. Processing the HDR signal may include tone-mapping the HDR video to produce the LDR signal and subtracting the LDR signal from the HDR signal to produce the residual signal. The LDR video may be compressed, e.g., using an MPEG encoder. The output signal is displayable as an 8-bit video by an LDR display, and displayable as HDR video by an HDR display.

In certain embodiments, the HDR signal is produced from the pixel values by a pipeline that includes a kernel operation that identifies saturated pixel values and a merge operation that merges the pixel values to produce the HDR signal. Preferably, the multiple image sensors all capture images simultaneously through a single lens. The method may include receiving incoming light through the lens and splitting the light via at least one beamsplitter onto the multiple image sensors, wherein at least 95% of the light gathered by the lens is captured by the multiple image sensors.

The multiple image sensors may include at least a high exposure (HE) sensor and a middle exposure (ME) sensor, and merging the sequences may include using HE pixel values that are not saturated and ME pixel values corresponding to the saturated pixel values. The multiple image sensors may further include a low-exposure (LE) sensor. In preferred embodiments, the multiple image sensors capture images that are optically identical except for light level.

The method operates in real-time and may include beginning to merge portions of the pixel values while still streaming later-arriving pixel values through the kernel operation.

The pipeline may be provided by a processing device (e.g., a field-programmable gate array or an application-specific integrated circuit) and each of the image sensors may include a color filter array. In some embodiments, the methods include demosaicing the HDR signal after the merging.

DETAILED DESCRIPTION

Figure 1:
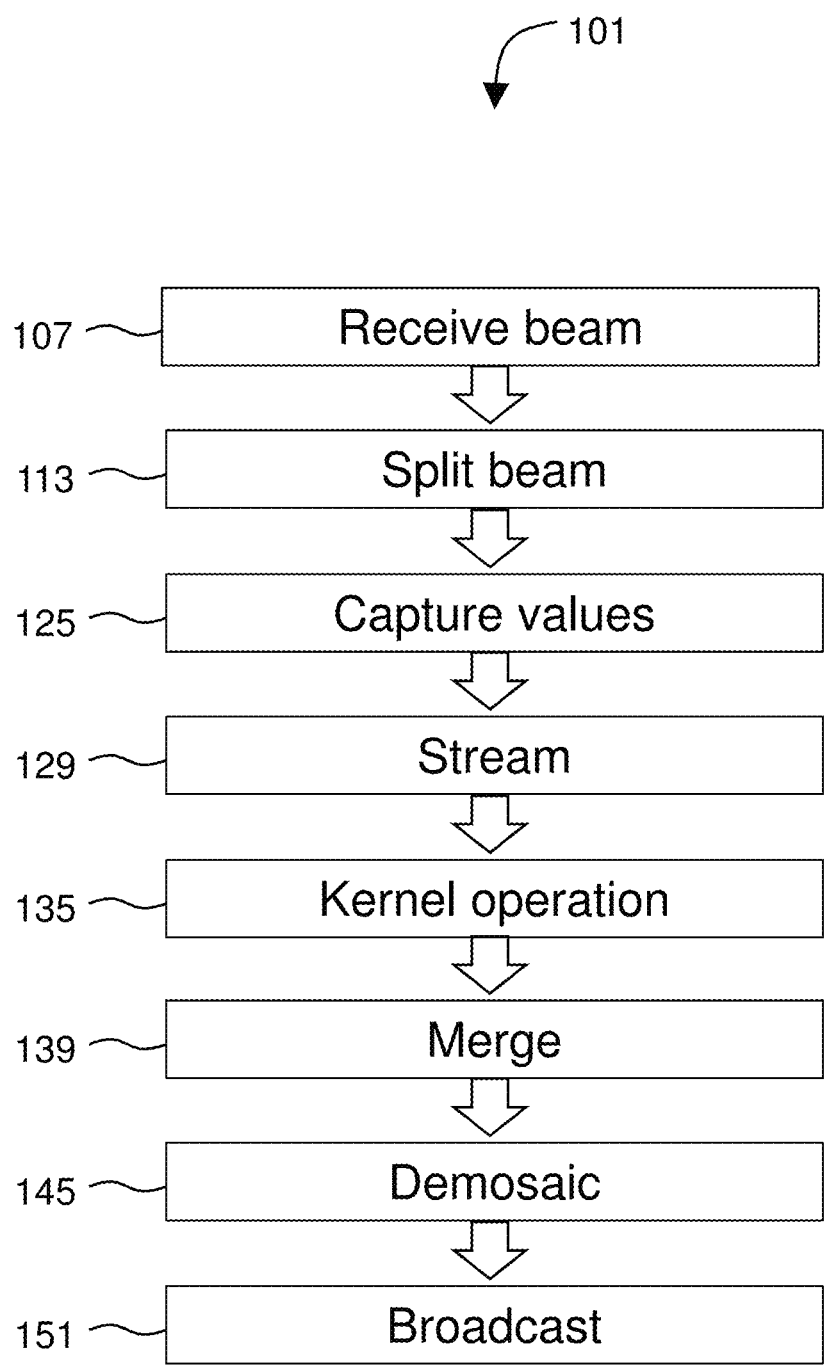
FIG. 1 shows steps of a method for producing real-time HDR video.

FIG. 1 shows steps of a method 101 for broadcasting video in real-time for LDR and HDR display. The method 101 includes receiving 107 light through the lens of an imaging apparatus. One or more beamsplitters split 113 the light into different paths that impinge upon multiple image sensors. Each image sensor then captures 125 a signal in the form of a pixel value for each pixel of the sensor. Where the sensor has, say, 1920×1080 pixels, the pixel values will stream off of the sensor to a connected processing device. The method includes streaming 129 pixel values 501 from each of multiple sensors in a frame independent-manner through a pipeline 231 on a processing device 219. The pipeline 231 includes a kernel operation 135 that identifies saturated pixel values. The pixel values 501 are merged 139. Typically, the merged image will be demosaiced 145 and this produces an HDR image. The HDR image is tone-mapped to produce an LDR image.

Then, the values of the LDR image are subtracted from the value of the HDR image to determine a set of residuals. The LDR image and the residuals are combined into a combined image signal that is broadcast 151.

The combined image signal can be received and displayed by conventional LDR display devices and also by HDR display devices. In that sense, the real time HDR video camera is backwards compatible and provides for live, real-time broadcast of HDR video that can be displayed by conventional LDR display devices. The LDR devices only "see" and display the 8-bit LDR signal. Any HDR devices decompress the signal and combine the LDR signal with the residuals to reconstitute the full HDR signal.

In the described method 101, the multiple image sensors all capture 125 images simultaneously through a single lens 311. The pipeline 231 and kernel operation 135 may be provided by an integrated circuit such as a field-programmable gate array or an application-specific integrated circuit. Each of the image sensors may include a color filter array 307. In preferred embodiments, the method 101 includes demosaicing 145 the HDR image after the merging step 139. The multiple image sensors preferably capture images that are optically identical except for light level.

A feature of the invention is that the pixel values 501 are pipeline processed in a frame-independent manner. Sequences of pixel values 501 are streamed 129 through the processing device 219 and merged 139 without waiting to receive pixel values 501 from all pixels on the image sensors. This means that the obtaining 125, streaming 129, and merging 139 steps may be performed by streaming 129 the sequences of pixel values 501 through the pipeline 231 on the processing device 219 such that no location on the processing device 219 stores a complete image. Because the pixel values are streamed through the pipeline, the final HDR video signal is produced in real-time. An apparatus 201 performing steps of the method 101 thus provides the function of a real-time HDR video camera. Real-time means that HDR video from the camera may be displayed essentially simultaneously as the camera captures the scene (e.g., at the speed that the signal travels from sensor to display minus a latency no greater than a frame of video, which in the current state of the art is typically ¹⁄₆₀ of a second). There is no requirement for post-processing the image data and no requirement to capture, store, compare, or process entire "frames" of images.

The output is an HDR video signal because the method 101 and the apparatus 201 use multiple sensors at different exposure levels to capture multiple isomorphic images (i.e., identical but for light level) and merge them. Data from a high exposure (HE) sensor are used where portions of an image are dim and data from a mid-exposure (ME) (or lower) sensor(s) are used where portions of an image are more brightly illuminated. The method 101 and apparatus 201 merge the HE and ME (and optionally LE) images to produce an HDR video signal. Specifically, the method 101 and the apparatus 201 identify saturated pixels in the images and replace those saturated pixels with values derived from sensors of a lower exposure. In preferred embodiments, a first pixel value from a first pixel on one of the image sensors is identified as saturated if it is above some specified level, for example at least 90% of a maximum possible pixel value.

Figure 2:
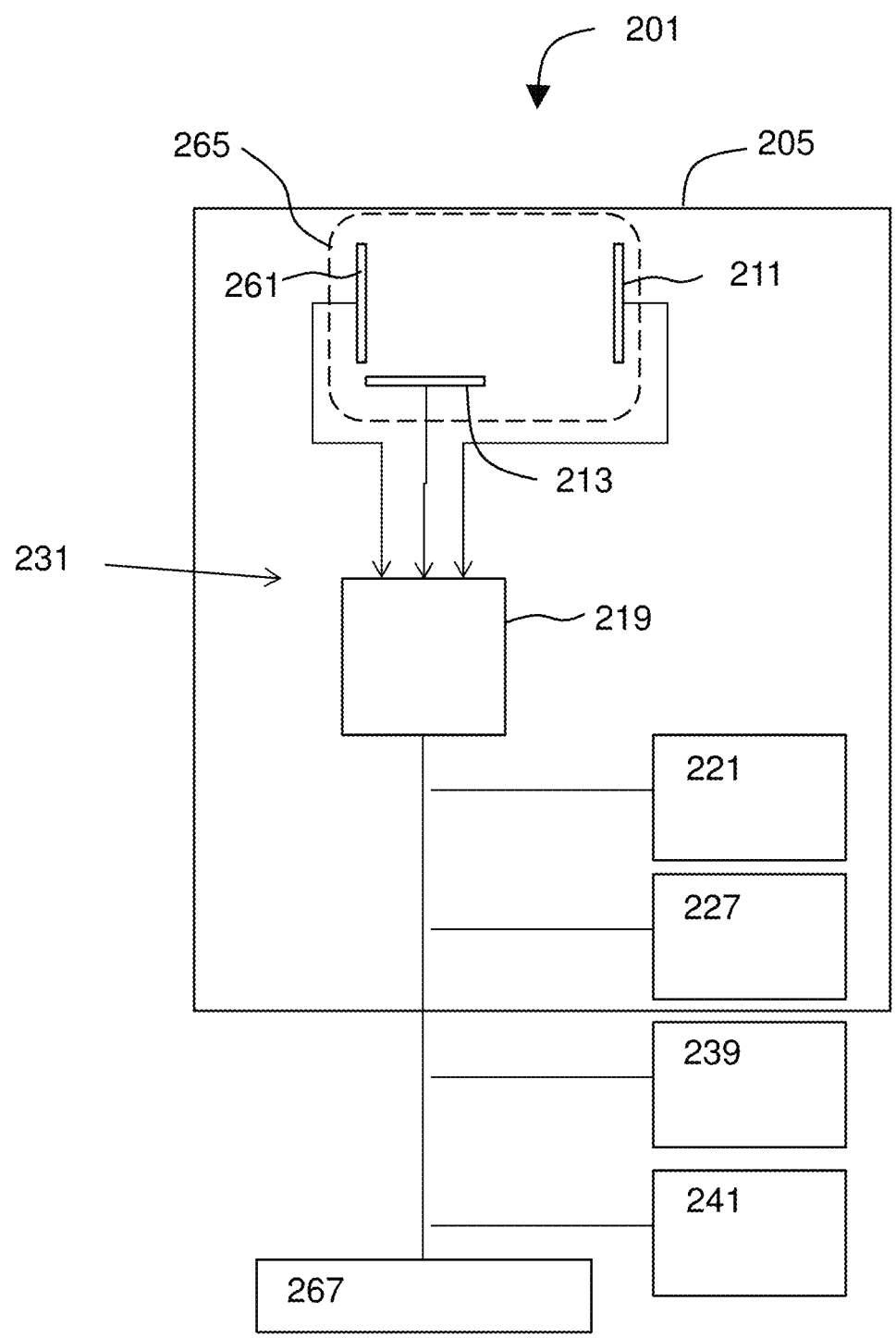
FIG. 2 shows an apparatus for HDR video processing.

FIG. 2 shows an apparatus 201 for HDR video processing. The apparatus 201 includes a processing device 219 such as a field-programmable gate array (FPGA) or an application-specific integrated circuit (ASIC). A plurality of image sensors 265 are coupled to the processing device 219. The apparatus 201 is configured to stream pixel values 501 from each of the plurality of image sensors 265 in a frame independent-manner through a pipeline 231 on the processing device 219. The pipeline 231 includes a kernel operation 413 that identifies saturated pixel values 501 and a merge module to merge the pixel values 501 to produce an HDR image.

The kernel operation 413 operates on pixel values 501 as they stream from each of the plurality of image sensors 265 by examining, for a given pixel on the HE sensor 213, values from a neighborhood 601 of pixels surrounding the given pixel, finding saturated values in the neighborhood 601 of pixels, and using information from a corresponding neighborhood 601 on the ME sensor 211 to estimate a value for the given pixel.

Various components of the apparatus 201 may be connected via a printed circuit board 205. The apparatus 201 may also include memory 221 and optionally a processor 227 (such as a general-purpose processor like an ARM microcontroller). Apparatus 201 may further include or be connected to one or more of an input-output device 239 or a display 267. Memory can include RAM or ROM and preferably includes at least one tangible, non-transitory medium. A processor may be any suitable processor known in the art, such as the processor sold under the trademark XEON E7 by Intel (Santa Clara, CA) or the processor sold under the trademark OPTERON 6200 by AMD (Sunnyvale, CA). Input/output devices according to the invention may include a video display unit (e.g., a liquid crystal display or LED display), keys, buttons, a signal generation device (e.g., a speaker, chime, or light), a touchscreen, an accelerometer, a microphone, a cellular radio frequency antenna, port for a memory card, and a network interface device, which can be, for example, a network interface card (NIC), Wi-Fi card, or cellular modem. The apparatus 201 may include or be connected to a storage device 241. The plurality of sensors are preferably provided in an arrangement that allows multiple sensors 265 to simultaneously receive images that are identical except for light level.

Figure 3:
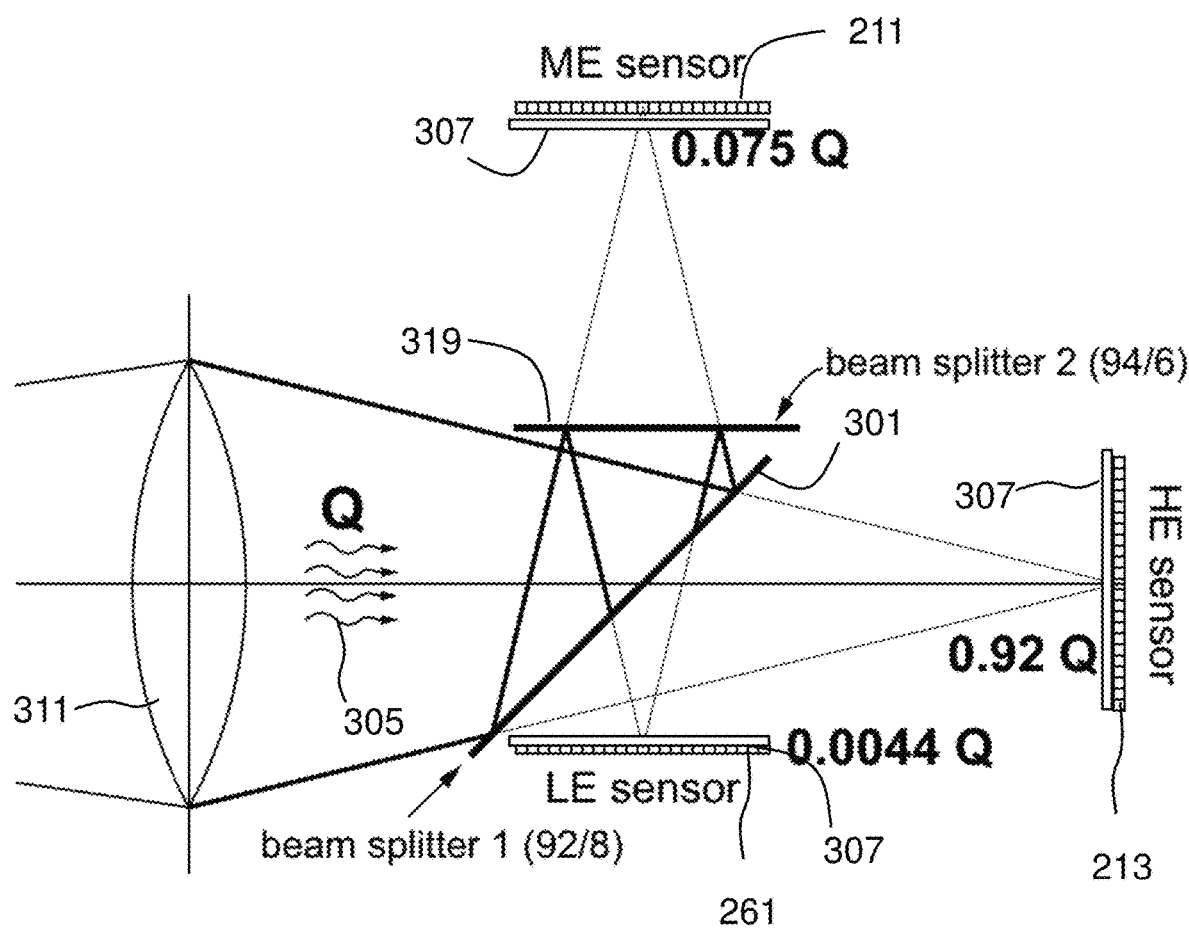
FIG. 3 shows an arrangement for multiple sensors.

FIG. 3 shows an arrangement for the multiple sensors 265. The multiple sensors preferably include at least a high exposure (HE) sensor 213 and a middle exposure (ME) sensor 211. Each image sensor may have its own color filter array 307. The color filter arrays 307 may operate as a Bayer filter such that each pixel receives either red, green, or blue light. As is known in the art, a Bayer filter includes a repeating grid of red, green, blue, green filters such that a sequence of pixel values streaming from the sensor corresponds to values for red, green, blue, green, red, green, blue, green, red, green, blue, green, . . . etc.

As shown in FIG. 3, the apparatus 201 may also include or be optically connected to a lens 311 and at least one beamsplitter 301. The HE sensor 213, the ME sensor 211, the lens 311 and the at least one beamsplitter 301 are arranged to receive an incoming beam of light 305 and split the beam of light 305 into at least a first path that impinges and HE sensor 213 and a second path that impinges on the ME sensor 211. In a preferred embodiment, the apparatus 201 uses a set of partially-reflecting surfaces to split the light from a single photographic lens 311 so that it is focused onto three imaging sensors simultaneously. In a preferred embodiment, the light is directed back through one of the beamsplitters a second time, and the three sub-images are not split into red, green, and blue but instead are optically identical except for their light levels. This design, shown in FIG. 3, allows the apparatus to capture HDR images using most of the light entering the camera.

In some embodiments, the optical splitting system uses two uncoated, 2-micron thick plastic beamsplitters that rely on Fresnel reflections at air/plastic interfaces so their actual transmittance/reflectance (T/R) values are a function of angle. Glass is also a suitable material option. In one embodiment, the first beamsplitter 301 is at a 45° angle and has an approximate T/R ratio of 92/8, which means that 92% of the light from the camera lens 311 is transmitted through the first beamsplitter 301 and focused directly onto the high-exposure (HE) sensor 213. The beamsplitter 301 reflects 8% of the light from the lens 311 upwards (as shown in FIG. 3), toward the second uncoated beamsplitter 319, which has the same optical properties as the first but is positioned at a 90° angle to the light path and has an approximate T/R ratio of 94/6.

Of the 8% of the total light that is reflected upwards, 94% (or 7.52% of the total light) is transmitted through the second beamsplitter 319 and focused onto the medium-exposure (ME) sensor 211. The other 6% of this upward-reflected light (or 0.48% of the total light) is reflected back down by the second beamsplitter 319 toward the first beamsplitter 301 (which is again at 45°), through which 92% (or 0.44% of the total light) is transmitted and focused onto the low-exposure (LE) sensor 261. With this arrangement, the HE, ME and LE sensors capture images with 92%, 7.52%, and 0.44% of the total light gathered by the camera lens 311, respectively. Thus a total of 99.96% of the total light gathered by the camera lens 311 has been captured by the image sensors. Therefore, the HE and ME exposures are separated by 12.2× (3.61 stops) and the ME and LE are separated by 17.0×(4.09 stops), which means that this configuration is designed to extend the dynamic range of the sensor by 7.7 stops.

This beamsplitter arrangement makes the apparatus 201 light efficient: a negligible 0.04% of the total light gathered by the lens 311 is wasted. It also allows all three sensors to "see" the same scene, so all three images are optically identical except for their light levels. Of course, in the apparatus of the depicted embodiment 201, the ME image has undergone an odd number of reflections and so it is flipped left-right compared to the other images, but this is fixed easily in software. In preferred embodiments, the three sensors independently stream incoming pixel values directly into a pipeline that includes a synchronization module. This synchronization module can correct small phase discrepancies in data arrival times to the system from multiple sensors.

Thus it can be seen that the beamsplitter 301 directs a majority of the light to the first path and a lesser amount of the light to the second path. Preferably, the first path and the second path impinge on the HE sensor 213 and the ME sensor 211, respectively, to generate images that are optically identical but for light level. In the depicted embodiment, the apparatus 201 includes a low exposure (LE) sensor.

In preferred embodiments, pixel values stream from the HE sensor 213, the ME sensor 211, and the LE sensor 261 in sequences directly to the processing device 219. Those sequences may be not synchronized as they arrive onto the processing device 219.

As shown by FIG. 3, the method 101 may include receiving 107 incoming light through the lens 311 and splitting 113 the light via at least one beamsplitter 301 onto the multiple image sensors, wherein at least 95% of the incoming beam of light 305 is captured by the multiple image sensors.

The apparatus 201 (1) captures optically-aligned, multiple-exposure images simultaneously that do not need image manipulation to account for motion, (2) extends the dynamic range of available image sensors (by over 7 photographic stops in our current prototype), (3) is inexpensive to implement, (4) utilizes a single, standard camera lens 311, and (5) efficiently uses the light from the lens 311.

The method 101 preferably (1) combines images separated by more than 3 stops in exposure, (2) spatially blends pre-demosaiced pixel data to reduce unwanted artifacts, (3) produces HDR images that are radiometrically correct, and (4) uses the highest-fidelity (lowest quantized-noise) pixel data available. The apparatus 201 can work with a variety of different sensor types and uses an optical architecture based on beamsplitters located between the camera lens and the sensors.

Figure 4:
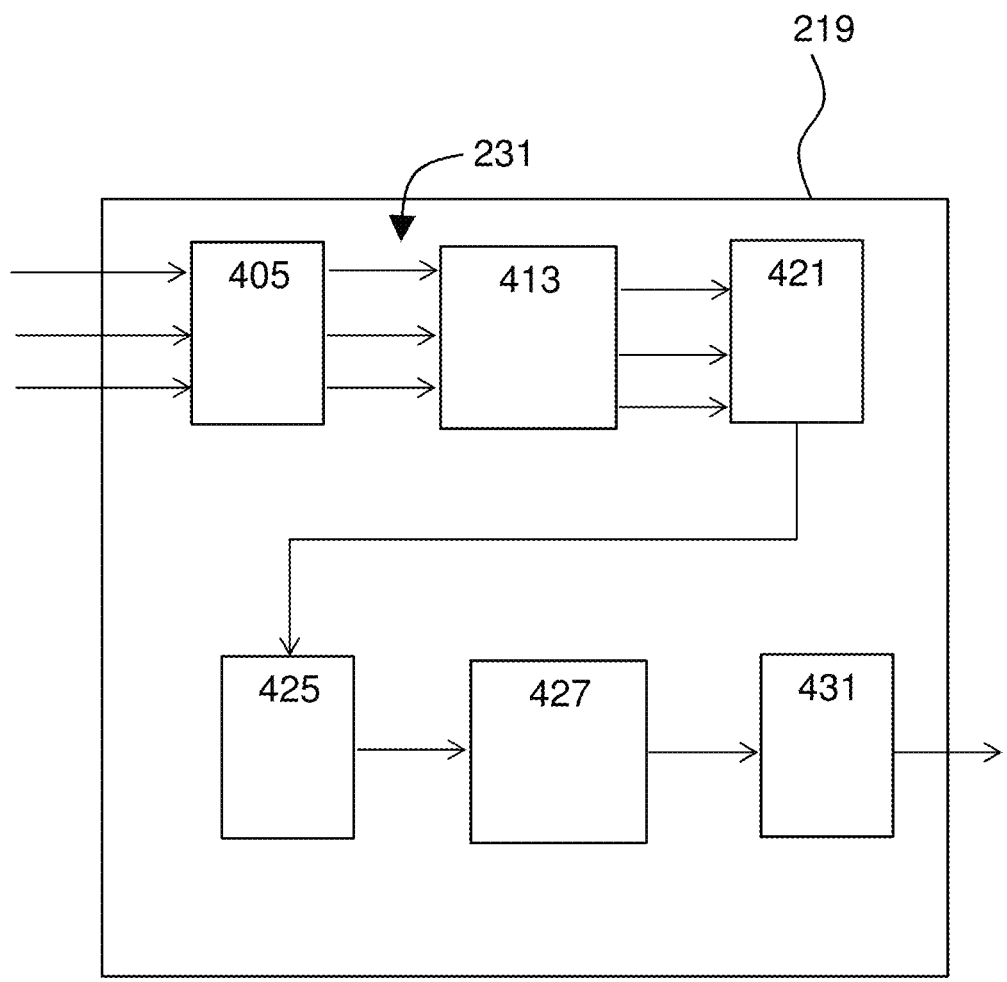
FIG. 4 shows a processing device on a real-time HDR video apparatus.

FIG. 4 shows the processing device 219 on the apparatus 201. As noted, the processing device 219 may be provided by one or more FPGA, ASIC, or other integrated circuit. Pixel values from the sensors stream through the pipeline 231 on the processing device 219. The pipeline 231 in the processing device 219 includes—in the order in which the pixel values 501 flow: a sync module 405 to synchronize the pixel values 501 as the pixel values 501 stream onto the processing device 219 from the plurality of image sensors 265; the kernel operation 413; the merge module 421; a demosaicing module 425; and a tone-mapping operator 427.

The tone mapping operator 427 produces an LDR signal. A compression module 431 subtracts the LDR signal from the HDR signal and combines the resulting residuals back with the LDR signal and transmits that combined signal for broadcast.

The pipeline 231 may include one or more auxiliary module such as a color-correction module; an HDR conversion module; and an HDR compression module.

Figure 5:
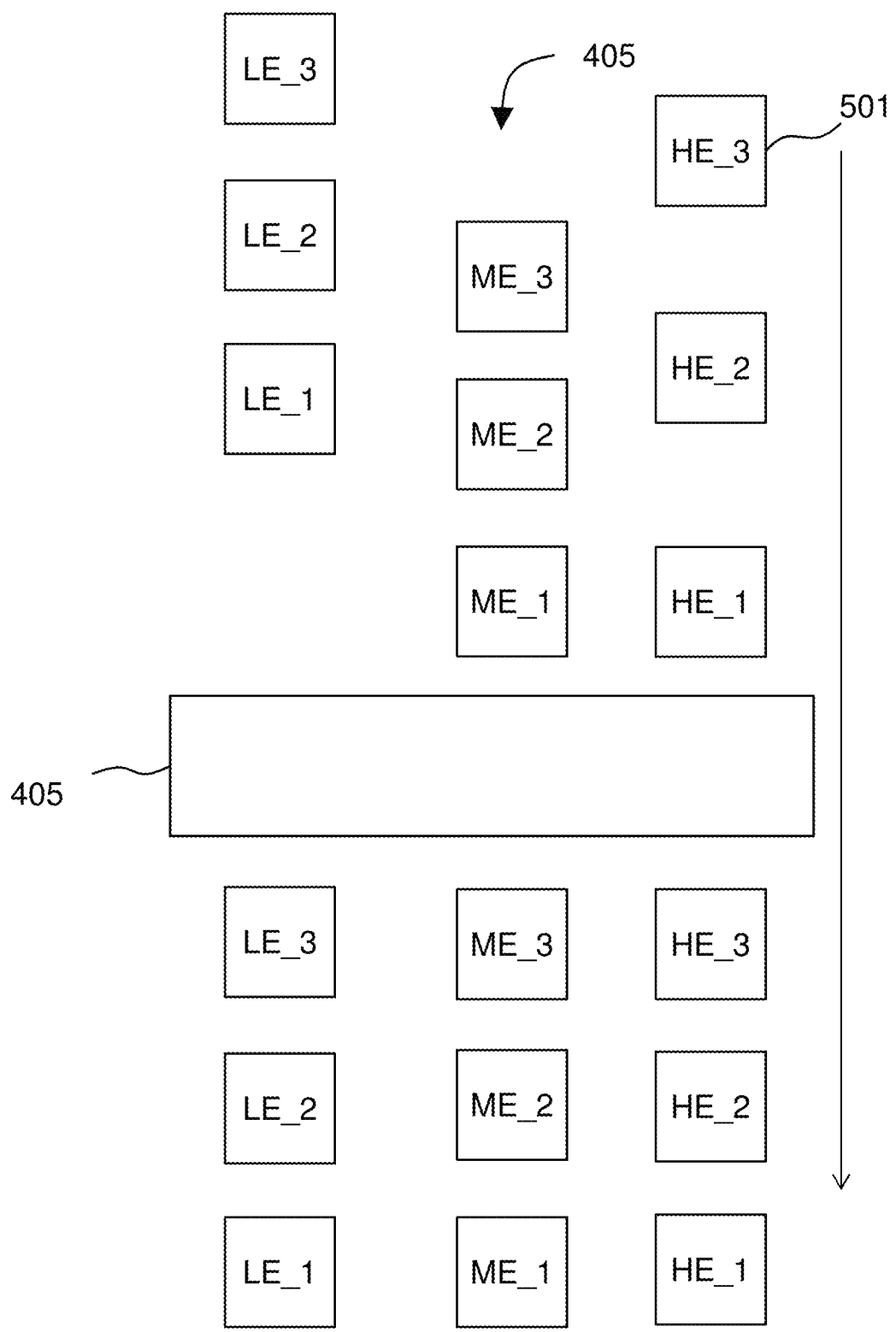
FIG. 5 shows operation of a sync module.

FIG. 5 shows operation of the sync module 405 to synchronize the pixel values 501 as the pixel values 501 stream onto the processing device 219 from the plurality of image sensors 265. As depicted in FIG. 5, HE_1 pixel value and ME_1 pixel value are arriving at the sync module 405 approximately simultaneously. However, HE_2 pixel value will arrive late compared to ME 2, and the entire sequence of LE pixel values will arrive late. The sync module 405 can contain small line buffers that circulate the early-arriving pixel values and release them simultaneous with the corresponding later-arriving pixel values. The synchronized pixel values then stream through the pipeline 231 to the kernel operation 413.

Figure 6:
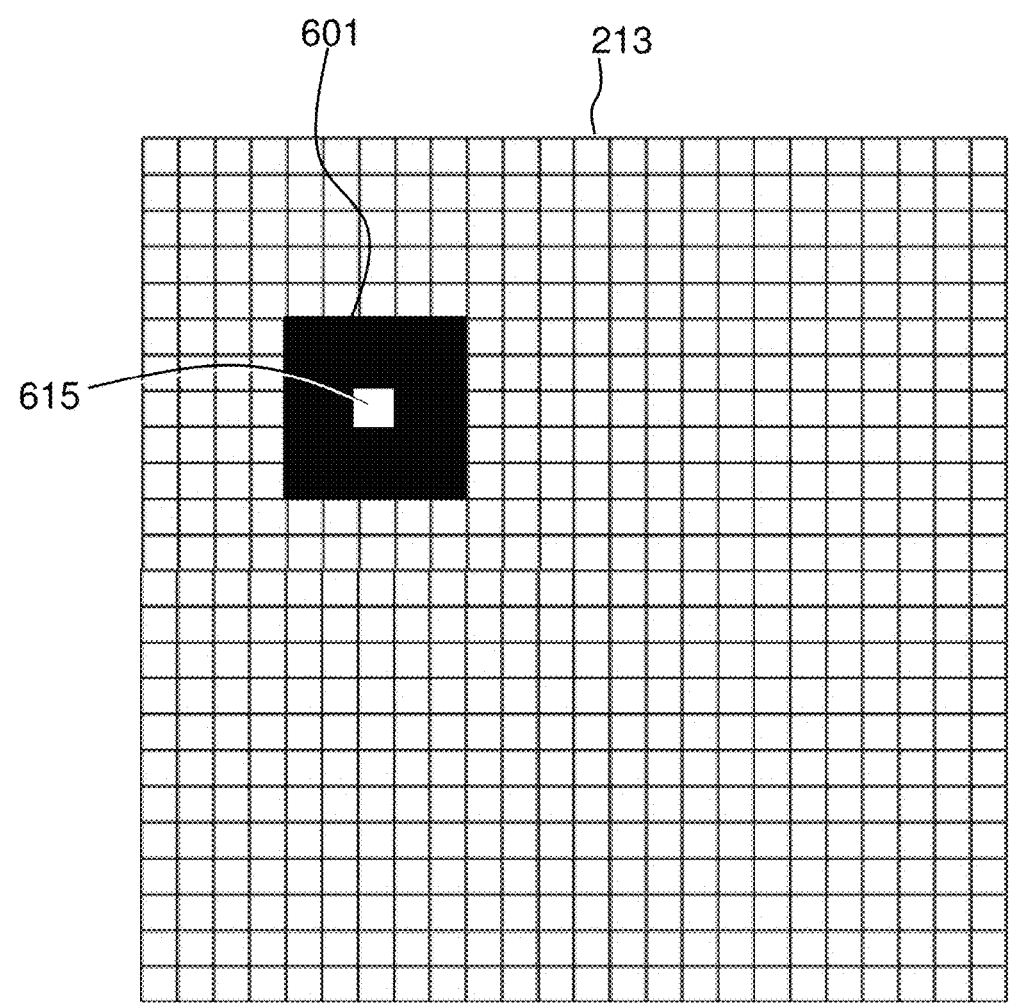
FIG. 6 illustrates how pixel values are presented to a kernel operation.
Figure 6:
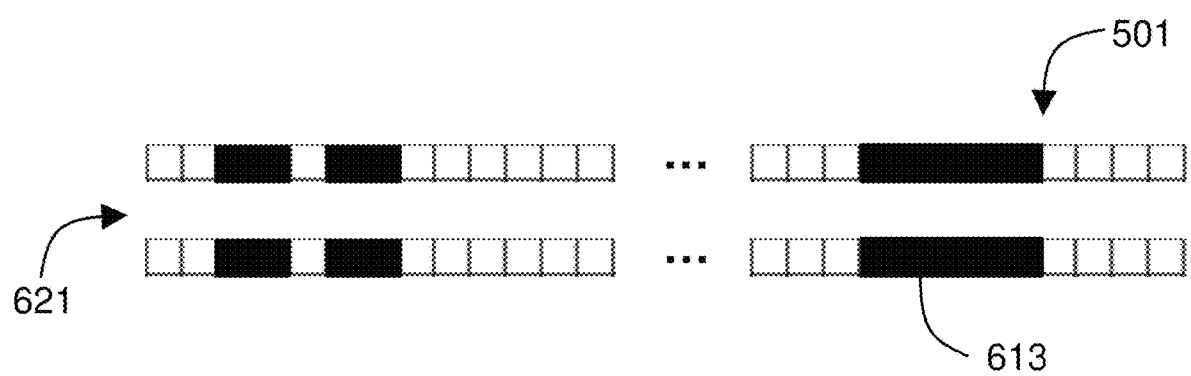

FIG. 6 illustrates how the pixel values are presented to the kernel operation 413. The top part of FIG. 6 depicts the HE sensor 213. Each square depicts one pixel of the sensor 213. A heavy black box with a white center is drawn to illustrate a given pixel 615 for consideration and a neighborhood 601 of pixels surrounding the given pixel 615. The heavy black box would not actually appear on a sensor 213 (such as a CMOS cinematic camera sensor)—it is merely drawn to illustrate what the neighborhood 601 includes and to aid understanding how the neighborhood 601 appears when the sequences 621 of pixel values 501 are presented to the kernel operation 413.

The bottom portion of FIG. 6 shows the sequences 621 of pixel values as they stream into the kernel operation 413 after the sync module 405. Pixel values 501 from the neighborhood 601 of pixels on the sensor 213 are still "blacked out" to aid illustration. The given pixel 615 under consideration can be spotted easily because it is surrounded on each side by two black pixels from the row of pixels on the sensor. There are two sequences 621, one of which comes from the depicted HE sensor 213 and one of which originates at the ME sensor 211.

Streaming the pixel values 501 through the kernel operation 413 includes examining values from a neighborhood 601 of pixels surrounding a first pixel 615 on the HE sensor 213, finding saturated values in the neighborhood 601 of pixels, and using information from a corresponding neighborhood 613 from the ME sensor 211 to estimate a value for the first pixel 615. This will be described in greater detail below. To accomplish this, the processing device must make comparisons between corresponding pixel values from different sensors. It may be useful to stream the pixel values through the kernel operation in a fashion that places the pixel under consideration 615 adjacent to each pixel from the neighborhood 601 as well as adjacent to each pixel from the corresponding neighborhood on another sensor.

Figure 7:
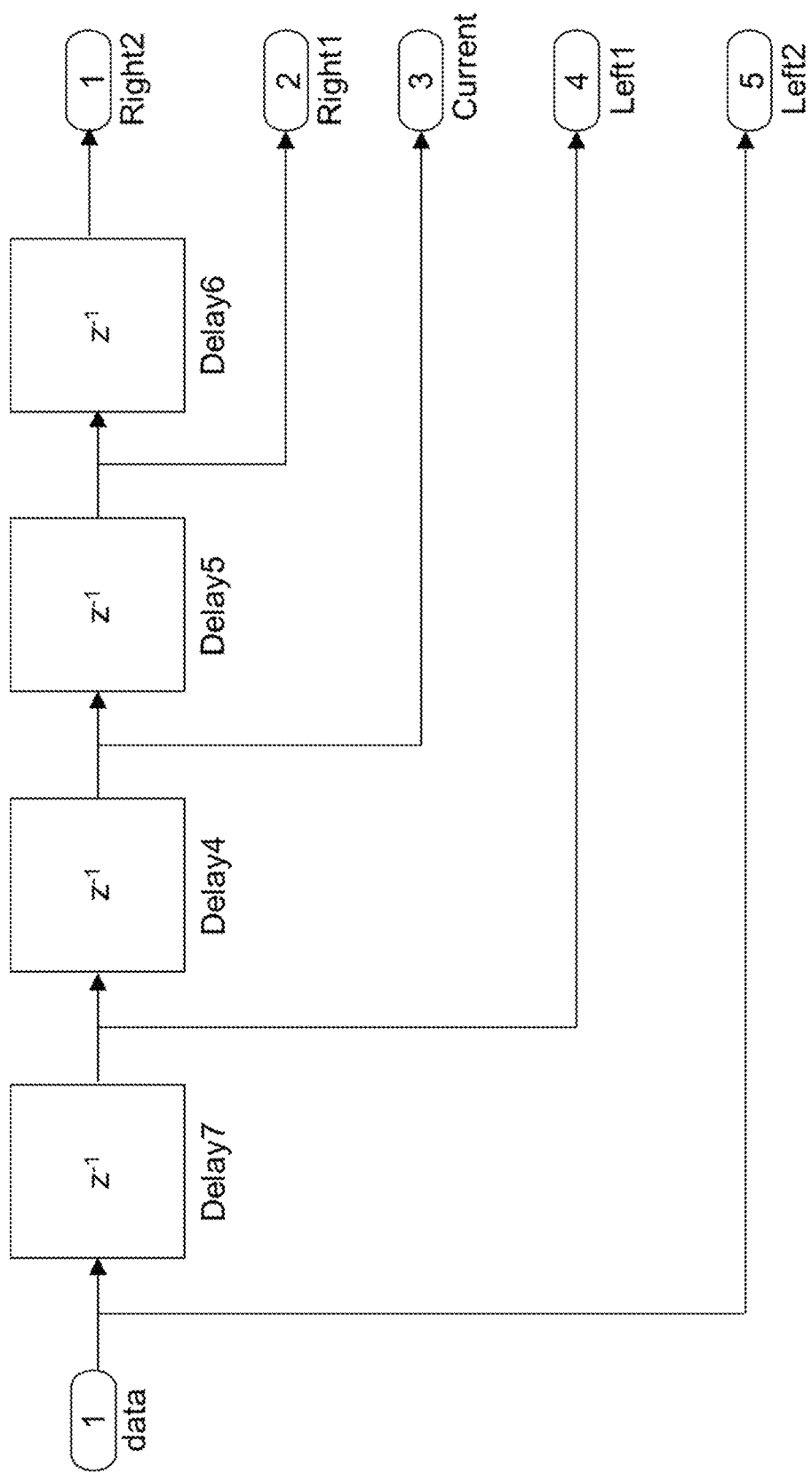
FIG. 7 shows an approach to modeling a pipeline.

FIG. 7 shows an approach to modeling the circuit so that the pipeline places the current pixel 615 adjacent to each of the following pixel values: a pixel value from 1 to the right on the sensor 213, a pixel value from 2 pixels to the right on sensor 213, a pixel value from 1 to the left, and pixel value from two to the left. As shown in FIG. 7, data flows into this portion of the pipeline and is copied four additional times. For each copy, a different and specific amount of delay is added to the main branch. The five copies all continue to flow in parallel. Thus, a simultaneous snapshot across all five copies covers the given current pixel value 615 and the other pixel values from the neighborhood 601. In this way, pixel values on either side of the pixel currently being processed can be used in that processing step, along with the pixel currently being processed. Thus the processing device can simultaneously read and compare the pixel value of the given pixel to the value of neighbors. The approach illustrated in FIG. 7 can be extended for comparisons to upper and lower neighbors, diagonal neighbors, and pixel values from a corresponding neighborhood on another sensor. Thus in some embodiments, streaming 129 the pixel values 501 through the kernel operation 413 includes streaming 129 the pixel values 501 through a path 621 within the processing device 219 that momentarily places a value from the first pixel proximal to each value originating from the neighborhood 601 of pixels.

The neighborhood comparisons may be used in determining whether to use a replacement value for a saturated pixel and what replacement value to use. An approach to using the neighborhood comparisons is discussed further down after a discussion of the merging. A replacement value will be used when the sequences 621 of pixel values 501 are merged 139 by the merge module 421. The merging 139 step excludes at least some of the saturated pixel values 501 from the HDR image.

Previous algorithms for merging HDR images from a set of LDR images with different exposures typically do so after demosaicing the LDR images and merge data pixel-by-pixel without taking neighboring pixel information into account.

To capture the widest dynamic range possible with the smallest number of camera sensors, it is preferable to position the LDR images further apart in exposure than with traditional HDR acquisition methods. Prior art methods yield undesired artifacts because of quantization and noise effects, and those problems are exacerbated when certain tone mapping operators (TMOs) are applied. Those TMOs amplify small gradient differences in the image to make them visible when the dynamic range is compressed, amplifying merging artifacts as well.

Figure 8:
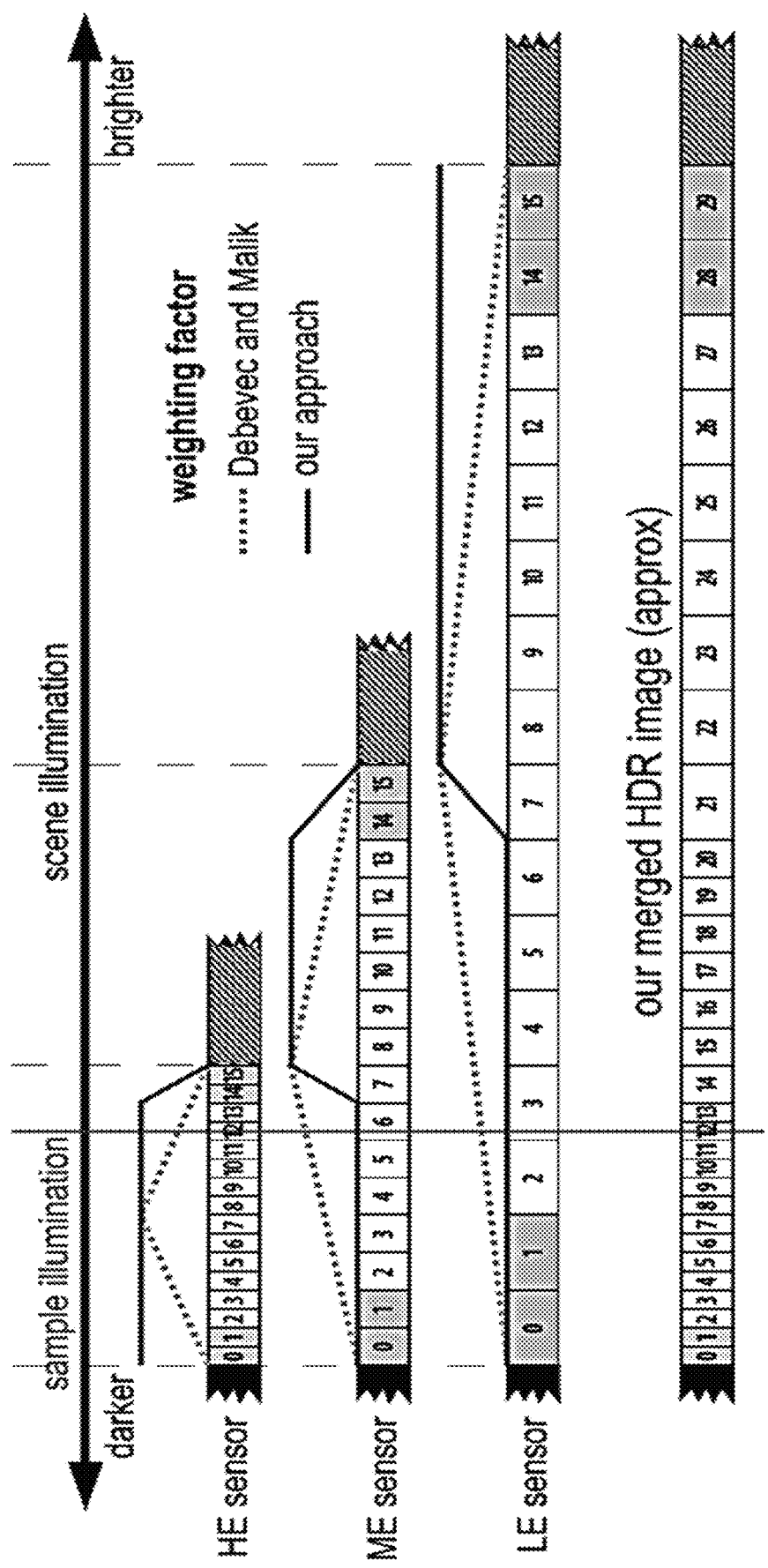
FIG. 8 illustrates merging to avoid artifacts.

FIG. 8 illustrates an approach to merging that reduces artifacts (e.g., compared to the weighting factor used in a merging algorithm in Debevec and Malik, 1997, Recovering high dynamic range radiance maps from photographs, Proceedings of ACM SIGGRAPH 1997:369-378, incorporated by reference). The "HE sensor", "ME sensor", and "LE sensor" bars in FIG. 8 present the range of scene illumination measured by the three sensors For illustration, the system is simplified with 4-bit sensors (as opposed to the 12-bit sensors as may be used in apparatus 201), which measure only 16 unique brightness values and the sensors are separated by only 1 stop (a factor of 2) in exposure. Since CMOS sensors exhibit an approximately linear relationship between incident exposure and their output value, the values from the three sensors are graphed as a linear function of incident irradiance instead of the traditional logarithmic scale.

Merging images by prior art algorithms that always use data from all three sensors with simple weighting functions, such as that of Debevec and Malik, introduces artifacts. In the prior art, data from each sensor is weighted with a triangle function as shown by the dotted lines, so there are non-zero contributions from the LE sensor at low brightness values (like the sample illumination level indicated), even though the data from the LE sensor is quantized more coarsely than that of the HE sensor.

Methods of the invention, in contrast, use data from the higher-exposure sensor as much as possible and blend in data from the next darker sensor when near saturation.

FIG. 8 shows that the LE sensor measures the scene irradiance more coarsely than the other two sensors. For example, the HE sensor may measure 4 different pixel values in a gradient before the LE sensor records a single increment. In addition, there is always some small amount of noise in the pixel values, and an error of ±1 in the LE sensor spans a 12 value range in the HE sensor for this example. Although Debevec and Malik's algorithm blends these values together, the method 101 and apparatus 201 use pixel values from only the longest-exposure sensor (which is less noisy) wherever possible, and blend in the next darker exposure when pixels approach saturation.

In certain embodiments, the method 101 and apparatus 201 not only examine individual pixels when merging the LDR images, but also take into account neighboring pixels 601 (see FIG. 6) that might provide additional information to help in the de-noising process.

One aspect of merging 139 according to the invention is to use pixel data exclusively from the brightest, most well-exposed sensor possible. Therefore, pixels from the HE image are used as much as possible, and pixels in the ME image are only used if the HE pixel is close to saturation. If the corresponding ME pixel is below the saturation level, it is multiplied by a factor that adjusts it in relation to the HE pixel based on the camera's response curve, given that the ME pixel receives 12.2× less irradiance than the HE pixel.

Figure 9:
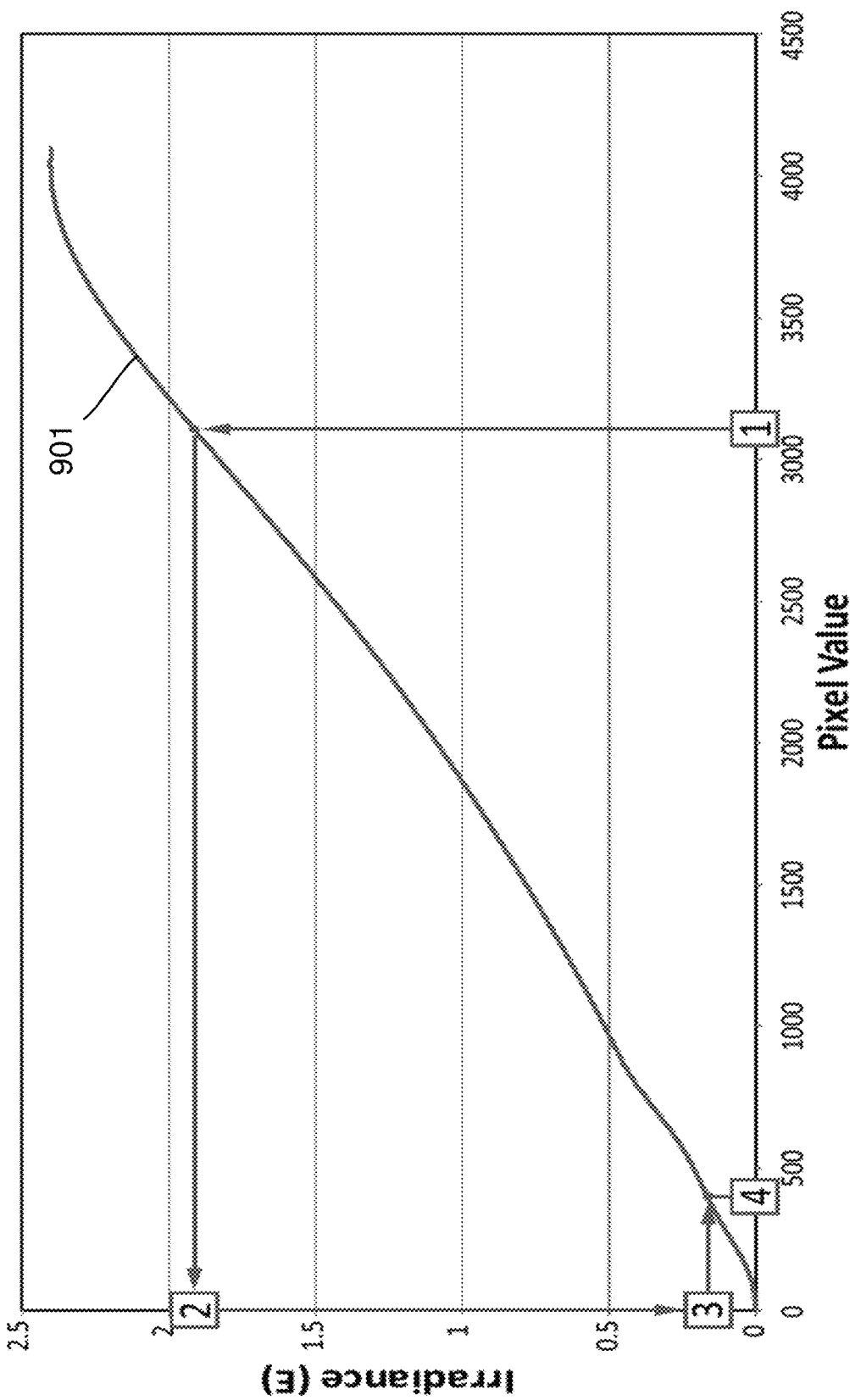
FIG. 9 shows a camera response curve used to adjust a pixel value.

FIG. 9 shows a camera response curve 901 used to obtain a factor for adjusting a pixel value. In a three-sensor embodiment, when the HE sensor is above the saturation level, and if the corresponding ME pixel is above the saturation level, then a similar process is applied to the same pixel in the low-exposure LE image.

It may be found that merging by a "winner take all" approach that exclusively uses the values from the HE sensor until they become saturated and then simply switch to the next sensor results in banding artifacts where transitions occur. To avoid such banding artifacts, the method 101 and apparatus 201 transition from one sensor to the next by spatially blending pixel values between the two sensors. To do this, the method 101 and apparatus 201 scan a neighborhood 601 around the pixel 615 being evaluated (see FIG. 6). If any neighboring pixels in this region are saturated, then the pixel under consideration may be subject to pixel cross-talk or leakage, and the method 101 and apparatus 201 will estimate a value for the pixel based on its neighbors in the neighborhood 601.

The method 101 and apparatus 201 perform merging 139 prior to demosaicing 145 the individual Bayer color filter array images because demosaicing can corrupt colors in saturated regions. For example, a bright orange section of a scene might have red pixels that are saturated while the green and blue pixels are not. If the image is demosaiced before being merged into HDR, the demosaiced orange color will be computed from saturated red-pixel data and non-saturated green/blue-pixel data. As a result, the hue of the orange section will be incorrectly reproduced. To avoid these artifacts, the method 101 and apparatus 201 perform HDR-merging prior to demosaicing.

Since the images are merged prior to the demosaicing step, the method 101 and apparatus 201 work with pixel values instead of irradiance. To produce a radiometrically-correct HDR image, the method 101 and apparatus 201 match the irradiance levels of the HE, ME, and LE sensors using the appropriate beamsplitter transmittance values for each pixel color, since these change slightly as a function of wavelength. Although the method 101 and apparatus 201 use different values to match each of the color channels, for simplicity the process is explained with average values. A pixel value is converted through the camera response curve 901, where the resulting irradiance is adjusted by the exposure level ratio (average of 12.2× for HE/ME), and this new irradiance value is converted back through the camera response curve 901 to a new pixel value.

FIG. 9 shows the 3-step HDR conversion process to match the irradiance levels of the HE, ME, and LE sensors. The HDR conversion process may be done for all HE pixel values (from 1 through 4096, for example), to arrive at a pixel-ratio curve, which gives the scaling factor for converting each ME pixel's value to the corresponding pixel value on the HE sensor for the same irradiance. In practice, separate pixel-ratio curves are calculated for each color (R, G, B) in the Bayer pattern. When comparing pixel values between HE and ME images (or between ME and LE images), a simple multiplier may be used, or the pixel-ratio curves may be used as lookup tables (LUTs) to convert HE pixel values less than 4096 into ME pixel values, or vice versa. When the HE pixel values are saturated, the pixel-ratio curve is extended using the last value obtained there (approximately 8).

The camera response curve 901 can be measured by taking a set of bracketed exposures and solving for a monotonically-increasing function that relates exposure to pixel value (to within a scale constant in the linear domain).

FIG. 9 shows the curve computed from the raw camera data, although a curve computed from a linear best-fit could also be used.

FIG. 9 gives a camera response curve that shows how the camera converts scene irradiance into pixel values. To compute what the ME pixel value should be for a given HE value, the HE pixel value (1) is first converted to a scene irradiance (2), which is next divided by our HE/ME attenuation ratio of 12.2. This new irradiance value (3) is converted through the camera response curve into the expected ME pixel value (4). Although this graph is approximately linear, it is not perfectly so because it is computed from the raw data, without significant smoothing or applying a linear fit. With the irradiance levels of the three images matched, the merging 139 may be performed.

In an illustrative example of merging 139, two registered LDR images (one high-exposure image IHE and a second medium-exposure image IME) are to be merged 139 into an HDR image IHDR. The merging 139 starts with the information in the high-exposure image IHE and then combines in data from the next darker-exposure image IME, as needed. To reduce the transition artifacts described earlier, the method 101 and apparatus 201 work on each pixel location (x, y) by looking at the information from the surrounding (2k+1)×(2k+1) pixel neighborhood 601, denoted as N(x,y).

In some embodiments as illustrated in FIG. 6, the method 101 and apparatus 201 use a 5×5 pixel neighborhood 601 (k=2), and define a pixel to be saturated if its value is greater than some specific amount, for example 90% of the maximum pixel value (4096 e.g., where sensor 213 is a 12-bit CMOS sensor).

In certain embodiments, the merging 139 includes a specific operation for each of the four cases for the pixel 615 on sensor 213 and its neighborhood 601 (see FIG. 6):

Case 1: The pixel 615 is not saturated and the neighborhood 601 has no saturated pixels, so the pixel value is used as-is.

Case 2: The pixel 615 is not saturated, but the neighborhood 601 has 1 or more saturated pixels, so blend between the pixel value at IHE(x, y) and the one at the next darker-exposure IME(x, y) depending on the amount of saturation present in the neighborhood.

Case 3: The pixel 615 is saturated but the neighborhood 601 has 1 or more non-saturated pixels, which can be used to better estimate a value for IHE(x,y): calculate the ratios of pixel values in the ME image between the unsaturated pixels in the neighborhood and the center pixel, and use this map of ME ratios to estimate the actual value of the saturated pixel under consideration.

Case 4: The pixel 615 is saturated and all pixels in the neighborhood 601 are saturated, so there is no valid information from the high-exposure image, use the ME image and set IHDR(x, y)=IME(x, y).

When there are three LDR images, the process above is simply repeated in a second iteration, substituting IHDR for IRE and ILE for IME. In this manner, data is merged 139 from the higher exposures while working toward the lowest exposure, and data is only used from lower exposures when the higher-exposure data is at or near saturation.

This produces an HDR image that can be demosaiced 145 and converted from pixel values to irradiance using a camera response curve similar to that of FIG. 9 accounting for all 3 color channels. The final HDR full-color image may then be tone mapped (e.g., with commercial software packages such as FDRTools, HDR Expose, Photomatix, etc.)

The apparatus 201 may be implemented using three Silicon Imaging SI-1920HD high-end cinema CMOS sensors mounted in a camera body. Those sensors have 1920× 1080 pixels (5 microns square) with a standard Bayer color filter array, and can measure a dynamic range of around 10 stops (excluding noise). The sensors are aligned by aiming the camera at small pinhole light sources, locking down the HE sensor and then adjusting setscrews to align the ME and LE sensors.

The camera body may include a Hasselblad lens mount to allow the use of high-performance, interchangeable commercial lenses. For beamsplitters, the apparatus may include uncoated pellicle beamsplitters, such as the ones sold by Edmund Optics [part number NT39-482]. The apparatus 201 may perform the steps of the method 101. Preferably, the multiple image sensors include at least a high exposure (HE) sensor 213 and a middle exposure (ME) sensor 211, and the merging includes using HE pixel values 501 that are not saturated and ME pixel values 501 corresponding to the saturated pixel values. The multiple sensors may further include a low exposure (LE) sensor 261, and the method 101 may include identifying saturated pixel values 501 originating from both the HE sensor 213 and the ME sensor 211. Because the pixel values stream through a pipeline, it is possible that at least some of the saturated pixel values 501 are identified before receiving values from all pixels of the multiple image sensors at the processing device 219 and the method 101 may include beginning to merge 139 portions of the sequences while still streaming 129 later-arriving pixel values 501 through the kernel operation 413.

It is understood that optical components such as beamsplitters, lenses, or filters—even if labeled "spectrally neutral"—may have slight wavelength-dependent differences in the amounts of light transmitted. That is, each image sensor may be said to have its own "color correction space" whereby images from that sensor need to be corrected out of that color correction space to true color. The optical system can be calibrated (e.g., by taking a picture of a calibration card) and a color correction matrix can be stored for each image sensor. The HDR video pipeline can then perform the counter-intuitive step of adjusting the pixel values from one sensor towards the color correction of another sensor—which may in some cases involve nudging the colors away from true color. This may be accomplished by multiplying a vector of RGB values from the one sensor by the inverse color correction matrix of the other sensor. After this color correction to the second sensor, the streams are merged, and the resulting HDR video signal is color corrected to truth (e.g., by multiplying the RGB vectors by the applicable color correction matrix). This color correction process accounts for spectral differences of each image sensor.

Figure 10:
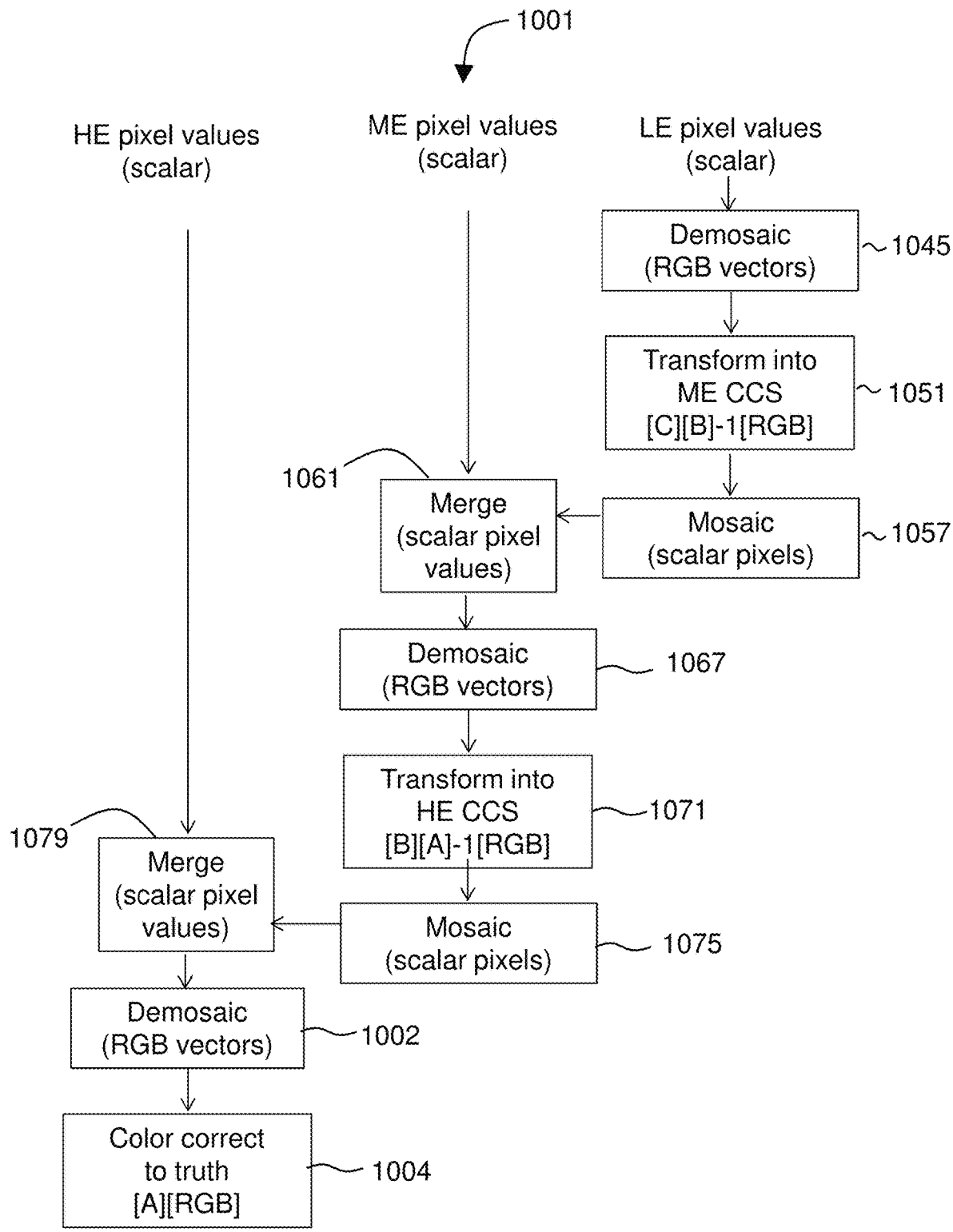
FIG. 10 shows a color correction processes.

FIG. 10 shows a color correction processes 1001 by which the HDR pipeline can correct for differences in spectral characteristics of each of the multiple sensors. To correct for the slight wavelength-dependent differences among the sensors, relationships between electron input and electron output can be measured experimentally using known inputs. By computing a correction factor for each sensor, the information detected by the sensors can be corrected prior to further processing. Thus, in some embodiments, the pipeline 231 includes modules for color correction. The steps of a color correction process may be applied at multiple locations along the pipeline, so the color correction may be implemented via specific modules at different locations on the FPGA. Taken together, those modules may be referred to as a color correction module that implements the color correction process 1001.

The color correction process 1001 converts one sensor's data from its color correction space to the color correction space of another sensor, before merging the images from the two sensors. The merged image data can then be converted to the color correction space of a third sensor, before being combined with the image data from that third sensor. The process may be repeated for as many sensors as desired. After all sensors' images have been combined, the final combined image may be demosaiced 145 and then may be color corrected to truth.

The color correction process 1001 allows images from multiple sensors to be merged, in stages where two images are merged at a time, in a way that preserves color information from one sensor to the next. For example purposes, in FIG. 10, the HE pixel values from the HE sensor are merged with the ME pixel values from the ME sensor. The result of merging is then merged with the LE pixel values from the LE sensor.

The basic principle guiding the color correction process 1001 is to first convert a dark image to the color correction space of the next brightest image, and then to merge the two "non-demosaiced" (or Color Filter Array [CFA] Bayer-patterned) images together.

The color correction process 1001, for an apparatus 201 with an ME sensor, an LE sensor, and an SE sensor, includes three general phases: an SE color correction space (CCS) phase, ME color correction space phase, and LE color correction space phase. The color correction process first begins with the SE color correction space phase, which comprises first demosaicing 1045 the LE pixel values and then transforming 1051 the resulting vectors into the color correction space of the ME image. The demosaicing process 1045 yields a full-color RGB vector value for each pixel.

After it has been demosaiced 1045, the LE image data is next transformed 1045 into the ME color correction space. The purpose is to match the color of the LE pixels (now described by RGB vectors) to the color of the ME array (with all of the ME array's color imperfections). To perform the transformation 1051, the LE RGB vectors are transformed 1051 by a color correction matrix. For example, Equations 1-3 show how to use the color correction matrices to correct the color values for the HE, ME, and LE sensors, respectively. Equation 1 shows how to use the color correction matrix to correct the color values of the HE sensor, where the 3×3 matrix coefficients, including values $A_1$-$A_9$, represent coefficients selected to strengthen or weaken the pixel value, and an RGB matrix ($R_{LE}$, $G_{LE}$, and $B_{LE}$) represents the demosaiced RGB output signal from the LE sensor. In some cases, the 3×3 matrix coefficients can be derived by comparing the demosaiced output against expected (or so-called "truth") values. For example, the 3×3 matrix coefficients can be derived by least-squares polynomial modeling between the demosaiced RGB output values and reference values from a reference color chart (e.g., a Macbeth chart). Similarly, Equation 2 shows how to use the color correction matrix to correct the color values of the ME sensor, where the RGB matrix ($R_{ME}$, $G_{ME}$, and $B_{ME}$) represents the demosaiced RGB output signal from the ME sensor, and Equation 3 shows how to use the color correction matrix to correct the color values of the SE sensor, where the RGB matrix ($R_{ME}$, $G_{ME}$, and $B_{ME}$) represents the demosaiced RGB output values from the SE sensor.

correcting SE pixel values using [A],     Equation 1 the Color Correction Matrix for the LE sensor $$\begin{bmatrix} A_1 & A_2 & A_3 \\ A_4 & A_5 & A_6 \\ A_7 & A_8 & A_9 \end{bmatrix} \begin{bmatrix} R_{LE} \\ G_{LE} \\ B_{LE} \end{bmatrix} = [A] \begin{bmatrix} R_{LE} \\ G_{LE} \\ B_{LE} \end{bmatrix} = \begin{bmatrix} R_{truth} \\ G_{truth} \\ B_{truth} \end{bmatrix}$$

correcting ME pixel values using [B],     Equation 2 the Color Correction Matrix for the ME sensor $$\begin{bmatrix} B_1 & B_2 & B_3 \\ B_4 & B_5 & B_6 \\ B_7 & B_8 & B_9 \end{bmatrix} \begin{bmatrix} R_{ME} \\ G_{ME} \\ B_{ME} \end{bmatrix} = [B] \begin{bmatrix} R_{ME} \\ G_{ME} \\ B_{ME} \end{bmatrix} = \begin{bmatrix} R_{truth} \\ G_{truth} \\ B_{truth} \end{bmatrix}$$

correcting SE pixel values using [C],     Equation 3 the Color Correction Matrix for the SE sensor $$\begin{bmatrix} C_1 & C_2 & C_3 \\ C_4 & C_5 & C_6 \\ C_7 & C_8 & C_9 \end{bmatrix} \begin{bmatrix} R_{SE} \\ G_{SE} \\ B_{SE} \end{bmatrix} = [C] \begin{bmatrix} R_{SE} \\ G_{SE} \\ B_{SE} \end{bmatrix} = \begin{bmatrix} R_{truth} \\ G_{truth} \\ B_{truth} \end{bmatrix}$$

To convert an image from a first color correction space (CCS) to a second color correction space, the color correction matrices from one or more sensors can be used. This process may be referred to as converting between color correction spaces or calibrating color correction spaces. Neither the first color correction space nor the second color correction space accurately reflects the true color of the captured image. The first and the second color correction space both have inaccuracies, and those inaccuracies are, in general, different from one another. Thus RGB values from each sensor must be multiplied by a unique color correction matrix for those RGB values to appear as true colors. The present invention comprises a method 1001 for converting an image from the LE sensor's color correction space to the ME sensor's color correction space and is illustrated in Equation 4 below:

converting LE pixel values from LE color     Equation 4 correction space to ME color correction space $$\begin{bmatrix} R_{SE} \\ G_{SE} \\ B_{SE} \end{bmatrix} [C][B]^{-1} = \begin{bmatrix} R_{ME} \\ G_{ME} \\ B_{ME} \end{bmatrix}$$

In Equation 4, the LE sensor's pixel values (R, G, B) are multiplied by the LE sensor's correction matrix, [C], and then multiplied by the inverse of the ME sensor's correction matrix, [B]. The result is a set of pixel values (R, G, B) that are in the ME sensor's color correction space.

Methods of the invention allow matching of the color correction space of the second sensor to the color correction space of the first sensor so that the images from the two sensors may be accurately combined, or merged. The method for applying all the inaccuracies of the second color correction space to the first color correction space, prior to combining images from the two into an HDR image, is previously unknown. Typical methods for combining data from multiple CFA sensors rely on color-correcting each sensor's data to the "truth" values measured from a calibrated color card, prior to combining the images. This is problematic in an HDR system, where it is known that the brighter sensor's image will have significant portions that are saturated, which saturated portions should actually have been utilized from the darker sensor's image when combining. Color correcting an image that has color information based on saturated pixels will cause colors to be misidentified. Therefore, in an HDR system, color-correcting the brighter image (for example, to "truth" color values), prior to combining images, will lead to colors being miss-identified because of the use of saturated pixel data in creating colors from a mosaic-patterned image. For this reason, we specify that (1) the darker image have its color information transformed to match the color space of the brighter image, (2) this transformed darker image be combined with the brighter image, and then (3) the final combined image be color-transformed to "truth" color values.

The solution provided in the present invention avoids this saturated-pixel color misidentification problem by performing the steps of [(a) demosaic 1045, (b) color correct 1051 & (c) mosaic 1057] data from the darker sensor, thereby ensuring all data is accurately returned to its non-demosaiced state prior to the step of merging the darker sensor's data with the brighter sensor's data.

Furthermore, prior to merging the images from two sensors, the present invention matches the color correction spaces of the two sensors. This transformation ensures that the two images (from the first and second color correction space sensors) can be accurately merged, pixel-for-pixel, in non-demosaiced format. It may at first seem counterintuitive to change the color correction space of one sensor to match the color correction space of a second sensor, especially when the second sensor's color correction space is known to differ from the "true" color correction space. However, it is an important feature in ensuring that (1) the brighter sensor's color information not be demosaiced prior to merging, and (2) the color data from both sensors is matched together, prior to merging the images. The color correction process 1001 uses matrices that may themselves be implemented as kernels in the pipeline 231 on the processing device 219. Thus the color correction process 1001 is compatible with an HDR pipeline workflow because the kernels are applied as they receive the pixel values.

After the LE information is transformed 1051 from the LE color correction space to the ME color correction space, the transformed values are mosaiced 1057 (i.e., the demosaicing process is reversed). The transformed scalar pixel values are now comparable with the Bayer-patterned scalar ME pixel values detected by the ME sensor, and the process 1001 includes merging 1061 of ME and HE non-demosaiced (i.e., scalar) sensor data.

The merged non-demosaiced image within the ME color correction space is then demosaiced 1067. This demosaicing 1064 is similar to the demosaicing 1045 described above, except the CFA pixel values undergoing the demosaicing process are now associated with the ME color correction space. The demosaicing 1067 produces RGB vectors in the ME color space. Those RGB vectors are transformed 1071 into the HE color space while also being color corrected ([B][A]−1[RGB]). An ME color correction matrix can be determined using the demosaiced color values, as shown above in Equation 2. The color corrected ME information is transformed 1071 from the ME color correction space to the HE color correction space by multiplying the ME color correction matrix by the inverse of the SE color correction matrix.

After the ME information is transformed 1071 from the ME color correction space to the HE color correction space, the transformed vectors are mosaiced 1075 (i.e., the demosaicing process is reversed). This allows the transformed ME CFA Bayer-patterned pixel values to merge 1079 with the HE pixel values detected by the HE sensor. At this point in the color correction process 1001, the transformed color information detected by the HE and ME sensors is now calibrated to match the color information detected by the HE sensor. This newly merged color value data set now represents color values within the HE color correction space 205.

Figure 11:
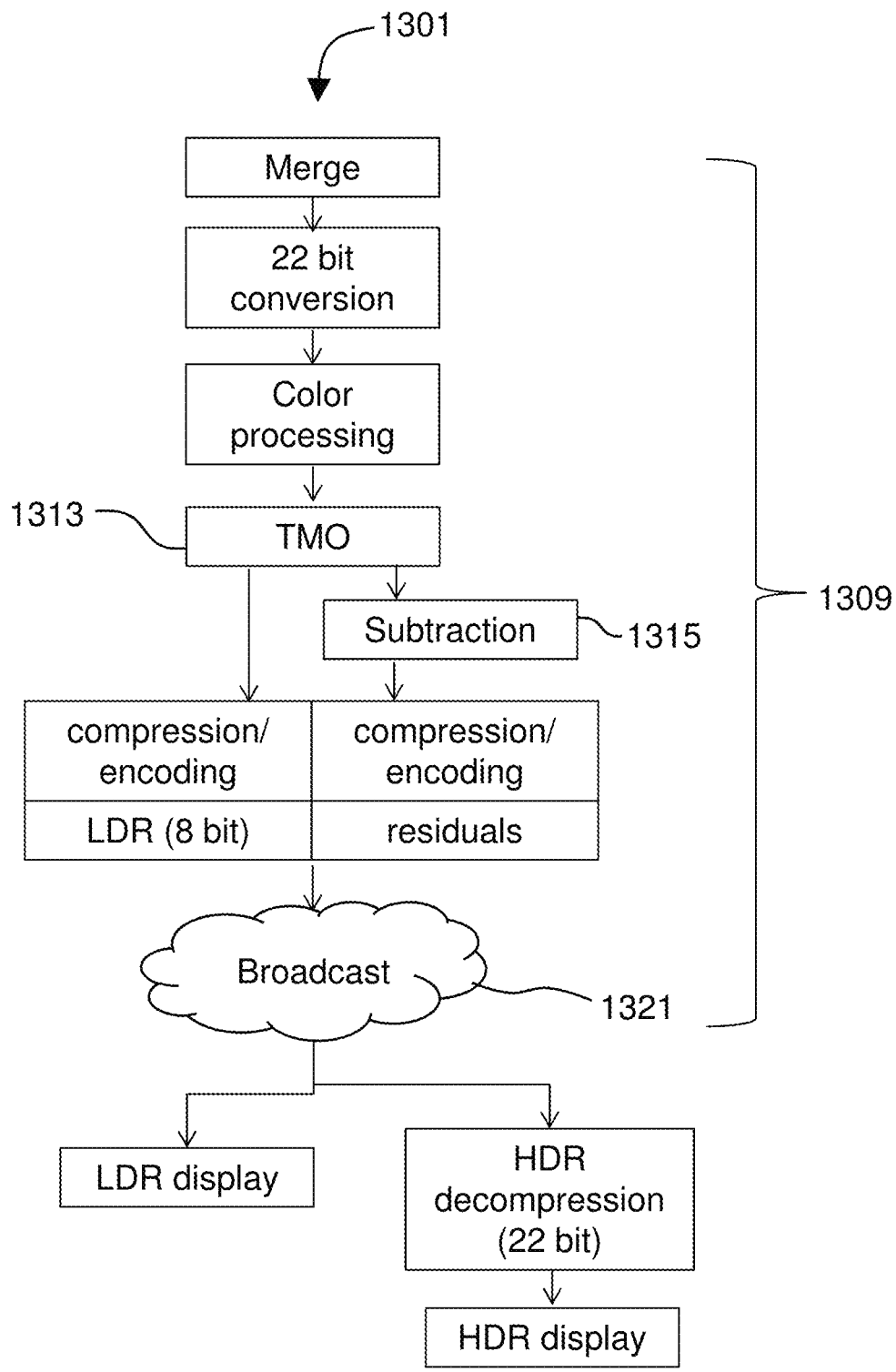
FIG. 11 illustrates a methods for combined HDR broadcasting.

FIG. 11 illustrates a method 1301 for combined broadcasting of high dynamic range (HDR) video with low dynamic range (LDR) video. The method 1301 provides for streaming HDR and LDR video. The method 1301 includes detecting 125—using an array of sensors 165—information representing a series of images, processing 1309 the information, and transmitting 1321 the information for HDR and LDR display in real time, with delay between detection and transmission of typically less than one frame.

After the color processing, the pipeline has produced an HDR video signal. That HDR video signal is then tone-mapped 1313 to produce an LDR video signal. The tone-mapped signal is included in the combined signal as the LDR signal. Additionally, the output of the tone-mapping is used in a subtraction 1315 to determine residuals.

The pipeline can include a module for subtraction 1315 that, in real-time, subtracts the LDR signal from the HDR signal (HDR−LDR=residual). What flows after the subtraction module is a pair of streams—the LDR video signal and the residual signal. Preferably, all of the color information is in the LDR signal.

Either the LDR signal or the residuals may be subject to any suitable compression or encoding (e.g., MPEG encoding). The pair of streams includes the 8-bit LDR signal and the residuals that provide for HDR display. This dual signal is broadcast over a communication network and may in-fact be broadcast over television networks, cellular networks, or the Internet. A device that receives the signal displays the video according to the capacity of that device. An LDR display device will "see" the 8-bit LDR signal and display a video at a dynamic range that is standard. An HDR display device will decompress the residuals and combine the dual streams into an HDR signal (e.g. 12-bits, or e.g. 22-bits) and display a video at a dynamic range that is high.

Thus, the method 1301 and the apparatus 201 may be used for real-time HDR video capture as well as for the simultaneous delivery of HDR and LDR output in a single transmission. The processing 1309 may include the workflow from the processing device 219 to video (broadcast) output. The method 1301 and the apparatus 201 provide for real-time processing and complementary HDR/LDR display using features described herein such as multiple sensors all obtaining an isomorphic image through a single lens and streaming the resulting pixel values through a pipeline to replace saturated pixels in a merged HDR video signal. The method 101 and the apparatus 201 each captures video information using an array of sensors, processes that video information in real-time, and transmits the video information in real-time in a HDR and LDR compatible format.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A method for streaming video for high dynamic range (HDR) and low dynamic range (LDR) display, the method comprising:
receiving frame-independent streams of pixel values from multiple image sensors onto a processing device in an HDR video camera;
streaming the pixel values through a pipeline on the processing device, wherein the pipeline includes a synchronization module that synchronizes the streams of pixel values, a kernel operation that identifies saturated pixel values, and a merge operation that merges the pixel values thereby producing an HDR signal;
tone-mapping the HDR signal to produce an LDR signal;
subtracting the LDR signal from the HDR signal to give a residual signal; and
transmitting an output signal comprising the LDR signal and the residual signal wherein the output signal is displayable as an 8-bit video by an LDR display, and displayable as HDR video by an HDR display.

2. The method of claim 1, further comprising compressing the LDR video using an MPEG encoder.

3. The method of claim 1, wherein the HDR video camera receives incoming light through a lens and a beamsplitter onto the images sensors.

4. The method of claim 1, wherein image sensors include at least a first sensor and a second sensor and wherein the HDR video camera further includes a lens and the at least one beamsplitter that are arranged to receive an incoming beam of light and split the beam of light into at least a first path that impinges and first sensor and a second path that impinges on the second sensor.

5. The method of claim 4, the image sensors all capture images simultaneously through the lens.

6. The method of claim 5, further wherein at least 95% of the light gathered by the lens is captured by the image sensors.

7. The method of claim 5, wherein the multiple image sensors all capture the images such that the captured images are optically identical except for their light levels.

8. The method of claim 5, further comprising beginning to merge portions of the pixel values while still streaming later-arriving pixel values through the kernel operation.

9. The method of claim 8, wherein the processing device selected from the group consisting of a field-programmable gate array and an application-specific integrated circuit.

10. The method of claim 9, wherein multiple image sensors capture images that are optically identical except for light level.

11. The method of claim 8, wherein each of the image sensors comprises a color filter array.

12. The method of claim 3, wherein the multiple sensors include at least three sensors and wherein the multiple sensors capture all but about 0.04% of the light received through the lens.

13. The method of claim 1, wherein the synchronization module comprises line buffers that circulate early-arriving pixel values and releases the early-arriving pixel values simultaneous with corresponding later-arriving pixel values.

* * * * *